US012211100B2

(12) United States Patent
Gorham et al.

(10) Patent No.: US 12,211,100 B2
(45) Date of Patent: *Jan. 28, 2025

(54) METHODS AND SYSTEMS FOR LOW LATENCY AUTOMATED TRADING

(71) Applicant: Exegy Incorporated, St. Louis, MO (US)

(72) Inventors: Timothy Gorham, Chicago, IL (US); David Edward Taylor, St. Louis, MO (US); Jeremy Walter Whatley, Ballwin, MO (US)

(73) Assignee: Exegy Incorporated, St. Louis, MO (US)

( * ) Notice: Subject to any disclaimer, the term of this patent is extended or adjusted under 35 U.S.C. 154(b) by 145 days.

This patent is subject to a terminal disclaimer.

(21) Appl. No.: 18/145,899

(22) Filed: Dec. 23, 2022

(65) Prior Publication Data

US 2023/0129554 A1 Apr. 27, 2023

Related U.S. Application Data

(63) Continuation of application No. 17/673,442, filed on Feb. 16, 2022, now Pat. No. 11,551,302.
(Continued)

(51) Int. Cl.
*G06Q 40/04* (2012.01)
*G06Q 30/0201* (2023.01)
(Continued)

(52) U.S. Cl.
CPC ......... *G06Q 40/04* (2013.01); *G06Q 30/0201* (2013.01); *G06Q 40/00* (2013.01); *G06Q 40/06* (2013.01)

(58) Field of Classification Search
CPC .... G06Q 40/04; G06Q 30/0201; G06Q 40/00; G06Q 40/06
See application file for complete search history.

(56) References Cited

U.S. PATENT DOCUMENTS

| 4,868,866 A | 9/1989 | Williams, Jr. |
| 5,270,922 A | 12/1993 | Higgins |

(Continued)

FOREIGN PATENT DOCUMENTS

| EP | 1640885 A1 * | 3/2006 | ......... G06F 17/5045 |
| EP | 1783604 A2 * | 5/2007 | ............. G06F 8/314 |

(Continued)

OTHER PUBLICATIONS

Huang et al.: Automated Trading Systems and Machine Learning Methods and Hardware Implementation: A Survey, Jul. 12, 2008, pp. 1-14. (Year: 2008).*

(Continued)

*Primary Examiner* — Bijendra K Shrestha
(74) *Attorney, Agent, or Firm* — Thompson Coburn LLP

(57) ABSTRACT

Disclosed herein are automated trading engine embodiments that operate on market data and re-engineer trading logic to operate on computational resources that are capable of providing highly parallelized processing operations to improve tick to trade latency. As an example, logic resources for the automated trading engine can implement aggressing strategies to place aggressing orders on markets when defined conditions are met. Further still, the aggressing strategies can be driven by low latency derivative pricing.

57 Claims, 19 Drawing Sheets

Related U.S. Application Data

(60) Provisional application No. 63/149,904, filed on Feb. 16, 2021.

(51) Int. Cl.
    *G06Q 40/00* (2023.01)
    *G06Q 40/06* (2012.01)

(56) References Cited

U.S. PATENT DOCUMENTS

| | | |
|---|---|---|
| 5,987,432 A | 11/1999 | Zusman et al. |
| 6,278,982 B1 | 8/2001 | Korhammer et al. |
| 6,388,584 B1 | 5/2002 | Dorward et al. |
| 6,711,558 B1 | 3/2004 | Indeck et al. |
| 7,139,743 B2 | 11/2006 | Indeck et al. |
| 7,181,437 B2 | 2/2007 | Indeck et al. |
| 7,414,975 B2 | 8/2008 | Olderdissen |
| 7,552,107 B2 | 6/2009 | Indeck et al. |
| 7,606,267 B2 | 10/2009 | Ho et al. |
| 7,636,703 B2 | 12/2009 | Taylor |
| 7,660,793 B2 | 2/2010 | Indeck et al. |
| 7,680,790 B2 | 3/2010 | Indeck et al. |
| 7,702,629 B2 | 4/2010 | Cytron et al. |
| 7,707,091 B1 | 4/2010 | Kauffman et al. |
| 7,827,089 B2 | 11/2010 | Sweeting et al. |
| 7,840,482 B2 | 11/2010 | Singla et al. |
| 7,904,376 B2 | 3/2011 | Shapiro et al. |
| 7,917,299 B2 | 3/2011 | Buhler et al. |
| 7,921,046 B2 | 4/2011 | Parsons et al. |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 8,069,102 B2 | 11/2011 | Indeck et al. |
| 8,095,508 B2 | 1/2012 | Chamberlain et al. |
| 8,131,697 B2 | 3/2012 | Indeck et al. |
| 8,156,101 B2 | 4/2012 | Indeck et al. |
| 8,326,819 B2 | 12/2012 | Indeck et al. |
| 8,374,986 B2 | 2/2013 | Indeck et al. |
| 8,379,841 B2 | 2/2013 | Taylor et al. |
| 8,407,122 B2 | 3/2013 | Parsons et al. |
| 8,458,081 B2 | 6/2013 | Parsons et al. |
| 8,478,680 B2 | 7/2013 | Parsons et al. |
| 8,515,682 B2 | 8/2013 | Buhler et al. |
| 8,549,024 B2 | 10/2013 | Indeck et al. |
| 8,595,104 B2 | 11/2013 | Parsons et al. |
| 8,600,856 B2 | 12/2013 | Parsons et al. |
| 8,620,881 B2 | 12/2013 | Chamberlain et al. |
| 8,626,624 B2 | 1/2014 | Parsons et al. |
| 8,655,764 B2 | 2/2014 | Parsons et al. |
| 8,737,606 B2 | 5/2014 | Taylor et al. |
| 8,751,452 B2 | 6/2014 | Chamberlain et al. |
| 8,762,249 B2 | 6/2014 | Taylor et al. |
| 8,768,805 B2 | 7/2014 | Taylor et al. |
| 8,768,888 B2 | 7/2014 | Chamberlain et al. |
| 8,843,408 B2 | 9/2014 | Singla et al. |
| 8,879,727 B2 | 11/2014 | Taylor et al. |
| 8,880,501 B2 | 11/2014 | Indeck et al. |
| 8,983,063 B1 | 3/2015 | Taylor et al. |
| 9,020,928 B2 | 4/2015 | Indeck et al. |
| 9,047,243 B2 | 6/2015 | Taylor et al. |
| 9,176,775 B2 | 11/2015 | Chamberlain et al. |
| 9,323,794 B2 | 4/2016 | Indeck et al. |
| 9,336,494 B1 | 5/2016 | Purpura et al. |
| 9,363,078 B2 | 6/2016 | Taylor et al. |
| 9,396,222 B2 | 7/2016 | Indeck et al. |
| 9,547,680 B2 | 1/2017 | Buhler et al. |
| 9,547,824 B2 | 1/2017 | Indeck et al. |
| 9,582,831 B2 | 2/2017 | Parsons et al. |
| 9,633,093 B2 | 4/2017 | Henrichs et al. |
| 9,633,097 B2 | 4/2017 | Tidwell et al. |
| 9,672,565 B2 | 6/2017 | Parsons et al. |
| 9,805,417 B2 | 10/2017 | Kemp, II et al. |
| 9,898,312 B2 | 2/2018 | Chamberlain et al. |
| 9,916,622 B2 | 3/2018 | Parsons et al. |
| 9,961,006 B1 | 5/2018 | Sutardja et al. |
| 9,990,393 B2 | 6/2018 | Parsons et al. |
| 10,037,568 B2 | 7/2018 | Taylor et al. |
| 10,062,115 B2 | 8/2018 | Taylor et al. |
| 10,102,260 B2 | 10/2018 | Lancaster et al. |
| 10,121,196 B2 | 11/2018 | Parsons et al. |
| 10,133,802 B2 | 11/2018 | Lancaster et al. |
| 10,146,845 B2 | 12/2018 | Henrichs et al. |
| 10,158,377 B2 | 12/2018 | Indeck et al. |
| 10,169,814 B2 | 1/2019 | Parsons et al. |
| 10,191,974 B2 | 1/2019 | Indeck et al. |
| 10,229,453 B2 | 3/2019 | Taylor et al. |
| 10,346,181 B2 | 7/2019 | Chamberlain et al. |
| 10,360,632 B2 | 7/2019 | Parsons et al. |
| 10,395,316 B2 | 8/2019 | Milne et al. |
| 10,411,734 B2 | 9/2019 | Indeck et al. |
| 10,467,692 B2 | 11/2019 | Parsons et al. |
| 10,504,183 B2 | 12/2019 | Venkataraman |
| 10,504,184 B2 | 12/2019 | Parsons et al. |
| 10,572,824 B2 | 2/2020 | Chamberlain et al. |
| 10,650,452 B2 | 5/2020 | Parsons et al. |
| 11,263,695 B2 | 3/2022 | Taylor et al. |
| 11,551,302 B2 | 1/2023 | Gorham et al. |
| 11,631,135 B2 | 4/2023 | Gorham et al. |
| 2002/0054604 A1 | 5/2002 | Kadambi et al. |
| 2002/0080871 A1 | 6/2002 | Fallon et al. |
| 2002/0156719 A1 | 10/2002 | Finebaum et al. |
| 2003/0069821 A1 | 4/2003 | Williams |
| 2003/0086300 A1 | 5/2003 | Noyes et al. |
| 2003/0172017 A1 | 9/2003 | Feingold et al. |
| 2004/0083158 A1 | 4/2004 | Addison et al. |
| 2006/0123425 A1 | 6/2006 | Ramarao et al. |
| 2006/0269148 A1 | 11/2006 | Farber et al. |
| 2007/0027788 A1 | 2/2007 | Bandman et al. |
| 2007/0156574 A1 | 7/2007 | Marynowski et al. |
| 2007/0198523 A1 | 8/2007 | Hayim |
| 2007/0294157 A1* | 12/2007 | Singla .................... G06Q 40/04 705/36 R |
| 2008/0010187 A1 | 1/2008 | Farrell et al. |
| 2008/0243675 A1 | 10/2008 | Parsons et al. |
| 2009/0182683 A1 | 7/2009 | Taylor et al. |
| 2010/0027545 A1 | 2/2010 | Gomes et al. |
| 2010/0138360 A1 | 6/2010 | Cutler et al. |
| 2011/0040701 A1 | 2/2011 | Singla et al. |
| 2011/0225081 A1* | 9/2011 | Kittelsen ................ G06Q 40/04 705/37 |
| 2012/0089496 A1 | 4/2012 | Taylor et al. |
| 2012/0116998 A1 | 5/2012 | Indeck et al. |
| 2012/0130922 A1 | 5/2012 | Indeck et al. |
| 2012/0246052 A1 | 9/2012 | Taylor et al. |
| 2012/0317051 A1 | 12/2012 | Tall, IV |
| 2014/0172662 A1 | 6/2014 | Weiss et al. |
| 2014/0180903 A1 | 6/2014 | Parsons et al. |
| 2014/0180904 A1 | 6/2014 | Parsons et al. |
| 2014/0180905 A1 | 6/2014 | Parsons et al. |
| 2014/0279342 A1 | 9/2014 | Maynard |
| 2015/0095622 A1 | 4/2015 | Yoshida |
| 2016/0027110 A1 | 1/2016 | Blum et al. |
| 2017/0063826 A1 | 3/2017 | Sundaresan et al. |
| 2017/0109822 A1 | 4/2017 | Borkovec et al. |
| 2017/0124166 A1 | 5/2017 | Thomas et al. |
| 2017/0124255 A1 | 5/2017 | Buhler et al. |
| 2017/0124758 A1 | 5/2017 | Jia |
| 2017/0220655 A1 | 8/2017 | Henrichs et al. |
| 2017/0330280 A1 | 11/2017 | Zagara et al. |
| 2018/0121103 A1* | 5/2018 | Kavanagh ............ H04L 47/805 |
| 2018/0276271 A1 | 9/2018 | Parsons et al. |
| 2018/0330444 A1 | 11/2018 | Taylor et al. |
| 2018/0365766 A1 | 12/2018 | Taylor et al. |
| 2019/0073719 A1 | 3/2019 | Parsons et al. |
| 2019/0079984 A1 | 3/2019 | Lancaster et al. |
| 2019/0108177 A1 | 4/2019 | Henrichs et al. |
| 2019/0155831 A1 | 5/2019 | Indeck et al. |
| 2019/0156301 A1 | 5/2019 | Bentov et al. |
| 2019/0205975 A1 | 7/2019 | Taylor et al. |
| 2019/0324770 A1 | 10/2019 | Chamberlain et al. |
| 2020/0007157 A1 | 1/2020 | Indeck et al. |
| 2020/0026564 A1 | 1/2020 | Bahramshahry et al. |
| 2020/0051317 A1 | 2/2020 | Muthler |

(56) References Cited

U.S. PATENT DOCUMENTS

| | | |
|---|---|---|
| 2020/0111163 A1 | 4/2020 | Parsons et al. |
| 2020/0184378 A1 | 6/2020 | Chamberlain et al. |
| 2020/0364791 A1 | 11/2020 | Taylor et al. |
| 2020/0401442 A1 | 12/2020 | Endo |
| 2021/0049012 A1 | 2/2021 | Yokoyama et al. |
| 2022/0222406 A1 | 7/2022 | Milton et al. |
| 2022/0261897 A1 | 8/2022 | Gorham et al. |
| 2022/0261898 A1 | 8/2022 | Gorham et al. |
| 2022/0261899 A1 | 8/2022 | Gorham et al. |
| 2022/0261900 A1 | 8/2022 | Gorham et al. |
| 2022/0261901 A1 | 8/2022 | Gorham et al. |
| 2022/0261902 A1 | 8/2022 | Gorham et al. |
| 2022/0261903 A1 | 8/2022 | Gorham et al. |
| 2022/0261904 A1 | 8/2022 | Gorham et al. |
| 2022/0261905 A1 | 8/2022 | Gorham et al. |
| 2022/0270171 A1 | 8/2022 | Gorham et al. |

FOREIGN PATENT DOCUMENTS

| | | |
|---|---|---|
| WO | 200207055 A2 | 1/2002 |
| WO | 2014197963 A1 | 12/2014 |

OTHER PUBLICATIONS

Carr et al.: Volatility Derivatives, 2009, Annual Review of Financial Economics, pp. 312-339 (Year: 2009).*

Roger et al.: A Comprehensive Survey on Parallelization and Elasticity in Stream Processing, Jan. 29, 2019, ACM, pp. 36:1-36:37. (Year: 2019).*

"Lava Trading Deploys Foundry", Light Reading, 2004, pp. 1-3.

Actel White Paper, "Flash FPGAs in the Value-Based Market", 2005, pp. 1-9.

Altera White Paper, "Accelerating High-Performance Computing with FPGAs", Altera Corporation, Oct. 2007, pp. 1-8, Version 1.1.

Compton et al., "Configurable Computing: A Survey of Systems and Software", Northwestern University, Dept. of ECE, Technical Report, 1999, pp. 1-39.

Gokhale et al., "Reconfigurable Computing: Accelerating Computation With Field-Programmable Gate Arrays", 2005, pp. 1-247, Springer.

Huang et al., "Automated Trading Systems Statistical and Machine Learning Methods and Hardware Implementation: A Survey", Enterprise Information Systems, 2019, pp. 132-144, vol. 13, No. 1.

International Search Report and Written Opinion for PCT/US2022/016578 dated Jun. 29, 2022.

Manahov, "High-Frequency Trading Order Cancellations and Market Quality: Is Stricter Regulation the Answer", Int. J. Fin Econ., 2021, pp. 5385-5407, vol. 26.

New York Stock Exchange, "XDP Integrated Feed Client Specification", Oct. 2019, pp. 1-31, Version 2.3a.

Office Action for U.S. Appl. No. 17/673,485 dated Jul. 11, 2022.

Roger et al., "A Comprehensive Survey on Parallelization and Elasticity in Stream Processing", ACM Computing Surveys, 2019, pp. 1-37, vol. 1, No. 1.

International Preliminary Report on Patentability for PCT/US2022/016578 dated Aug. 31, 2023.

Office Action for U.S. Appl. No. 17/673,573 dated Aug. 1, 2024.

Office Action for U.S. Appl. No. 17/673,328 dated Jul. 28, 2022.

Office Action for U.S. Appl. No. 17/673,343 dated Aug. 19, 2022.

Office Action for U.S. Appl. No. 17/673,573 dated Oct. 24, 2023.

Office Action for U.S. Appl. No. 17/673,628 dated May 18, 2023.

Office Action for U.S. Appl. No. 17/673,628 dated Jul. 24, 2024.

Office Action for U.S. Appl. No. 17/673,557 dated Dec. 22, 2023.

Office Action for U.S. Appl. No. 17/673,580 dated Dec. 5, 2023.

Office Action for U.S. Appl. No. 17/673,604 dated Feb. 15, 2024.

Office Action for U.S. Appl. No. 17/673,610 dated Dec. 7, 2023.

Office Action for U.S. Appl. No. 17/673,628 dated Nov. 24, 2023.

Prosecution History for U.S. Appl. No. 17/673,442, filed Feb. 16, 2022, now U.S. Pat. No. 11,551,302.

Prosecution History for U.S. Appl. No. 17/673,485, filed Feb. 16, 2022, now U.S. Pat. No. 11,631,135.

Extended European search report and opinion for EP application 22756825.0 dated Sep. 5, 2024.

Gerlein et al: "Multi-agent pre-trade analysis acceleration in FPGA", 2014 IEEE Conference On Computational Intelligence for Financial Engineering & Economics (CIFER), Mar. 27, 2014, pp. 262-269,.

Zhang et al., "QuantCloud: Enabling Big Data Complex Event Processing for Quantitative Finance Through a Data-Driven Execution", IEEE Transactions On Big Data, Dec. 1, 2019, pp. 564-575, vol. 5, No. 4.

* cited by examiner

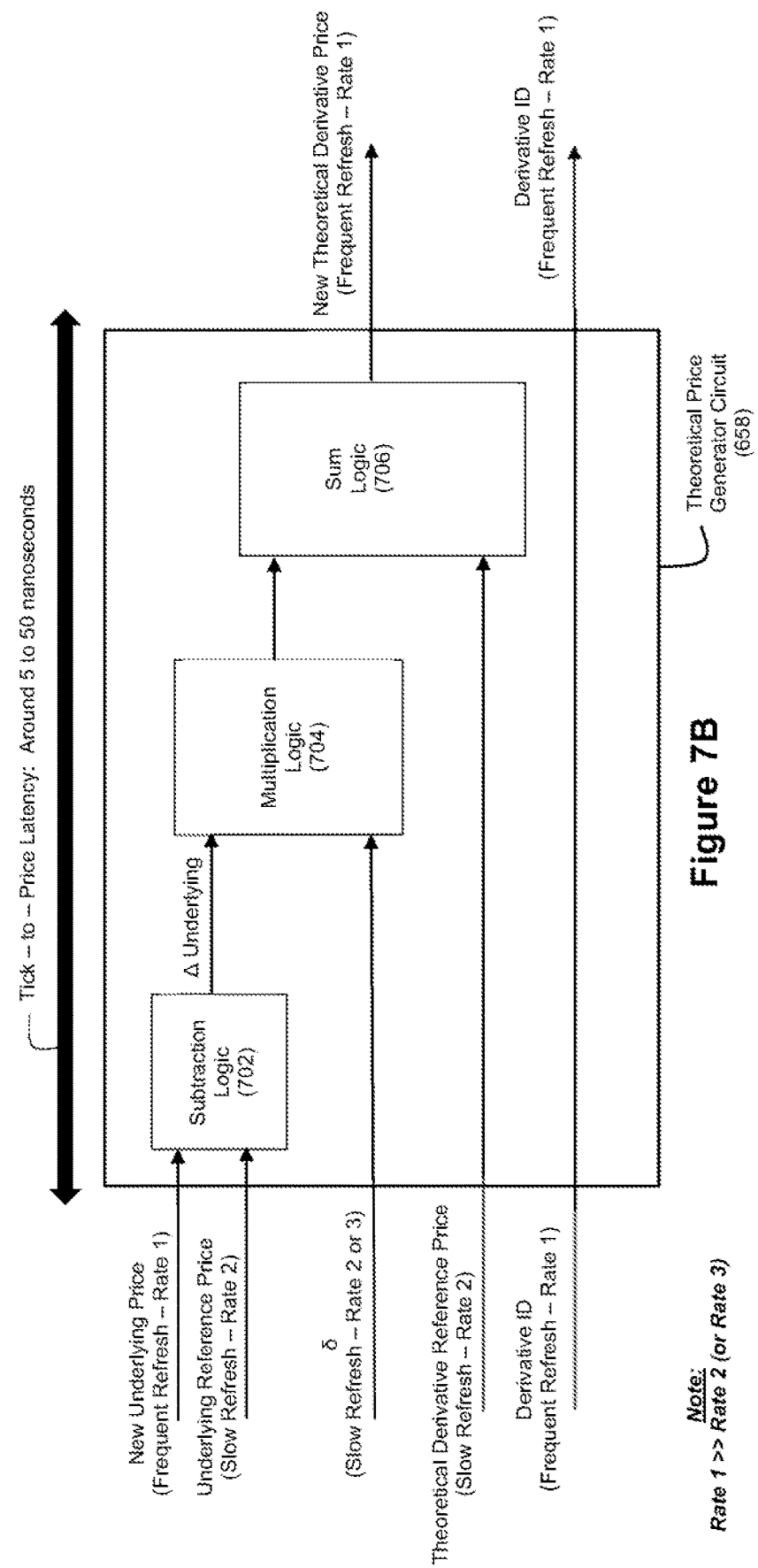

METHODS AND SYSTEMS FOR LOW LATENCY AUTOMATED TRADING

CROSS-REFERENCE AND PRIORITY CLAIM TO RELATED PATENT APPLICATIONS

This patent application is a continuation of U.S. patent application Ser. No. 17/673,442, filed Feb. 16, 2022, and entitled "Methods and Systems for Low Latency Automated Trading Using an Aggressing Strategy", now U.S. Pat. No. 11,551,302, which claims priority to U.S. provisional patent application Ser. No. 63/149,904, filed Feb. 16, 2021, and entitled "Methods and Systems for Low Latency Automated Trading", the entire disclosures of each of which are incorporated herein by reference.

This patent application is related to (1) U.S. patent application Ser. No. 17/673,328, filed Feb. 16, 2021, and entitled "Methods and Systems for Market Making at Low Latency", (2) U.S. patent application Ser. No. 17/673,557, filed Feb. 16, 2021, and entitled "Methods and Systems for Joining Market Making at Low Latency", (3) U.S. patent application Ser. No. 17/673,573, filed Feb. 16, 2021, and entitled "Methods and Systems for Bettering Market Making at Low Latency", (4) U.S. patent application Ser. No. 17/673,343, filed Feb. 16, 2021, and entitled "Methods and Systems for Implementing Market Making Strategies at Low Latency", (5) U.S. patent application Ser. No. 17/673,580, filed Feb. 16, 2021, and entitled "Methods and Systems for Mass Quoting at Low Latency", (6) U.S. patent application Ser. No. 17/673,604, filed Feb. 16, 2021, and entitled "Methods and Systems for Pricing Derivatives at Low Latency", (7) U.S. patent application Ser. No. 17/673,485, filed Feb. 16, 2021, and entitled "Methods and Systems for Low Latency Automated Trading Using a Canceling Strategy", (8) U.S. patent application Ser. No. 17/673,610, filed Feb. 16, 2021, and entitled "Methods and Systems for Low Latency Automated Trading Using a Hedging Strategy", and (9) U.S. patent application Ser. No. 17/673,628, filed Feb. 16, 2021, and entitled "Methods and Systems for Low Latency Automated Trading", the entire disclosures of each of which are incorporated herein by reference.

INTRODUCTION

Many financial trading strategies benefit from the ability to quickly respond to market events. This is especially true for automated strategies that trade on electronic financial markets. In some forms of trading, such as volatility trading of derivatives contracts, the speed at which an automated strategy is able to operate is a primary determiner of its likelihood of profit as well as its risk of loss.

In its most basic form, an automated trading strategy sends messages to buy and sell financial instruments to trading venues as depicted in FIG. 1. The decisions to buy and sell are dictated by configuration information provided by a user or other component of a trading system, real-time information provided by financial market data feeds, and responses from trading venues such as acknowledgements of order reception, order rejection notifications, and "fill" reports of completed trades.

Depending upon the type of automated trading strategy, the system may receive configuration information infrequently (e.g. prior to the beginning of a trading session) or continuously (e.g. many times per second). It may trade on a single venue; it may trade the same fungible financial instruments across multiple venues; or it may trade underlying and derivatives instruments across multiple venues. It may consume real-time market data feeds from multiple markets, including markets that it is not trading upon, as well as other forms of data such as sentiment scores derived from various forms of media and "alternative data" such as consumer data collected from payments systems.

A primary measure of the speed at which an automated trading strategy functions is its "tick to trade" latency—the elapsed time from the arrival of a triggering event (i.e. "tick") at the input of the system to the transmission of a resulting message to a trading venue (i.e. "the trade"). Typically, the "tick" is new pricing information from a real-time financial market data feed. Note that it may also be a new sentiment score or receipt of a "fill" report from a trading venue. The type of responding order message sent to a trading venue depends upon the type of automated trading strategy. Tick-to-trade latency is depicted in FIG. 1 as the difference between the arrival of new pricing information on the financial market data feed at time $t_0$ and the transmission of a new order message via the direct market access connection to the trading venue at time $t_1$.

Market making is a trading strategy that continuously posts offers to both buy and sell a financial instrument with the goal of achieving an aggregate sale price higher than an aggregate buy price. This is commonly referred to as "capturing the spread" between the best offer and best bid price. Competition among market makers for these opportunities to capture the spread generally drives offer and bid prices closer together, thus narrowing the spread and reducing the profit on each market making trade. Generally, maximizing market making profits then depends upon maximizing the number of trades performed. It is largely for this reason that market making strategies were some of the first to be automated. Market making strategies that can quickly respond to changes in financial instrument prices and post new best bid and offer (BBO) prices maximize their opportunity to capture the spread on the next transaction.

The policy of the trading venue also contributes to market making strategies. When a trade occurs at a price posted by multiple market participants (which are usually market makers), the venue must define how the transaction is apportioned to the participants at that price. In a time-priority stock market, the executed shares are apportioned in the order in which the posted prices from the participants were received. One can imagine market makers lining up at a common price for the opportunity to trade at that price. Again, the speed at which a market maker responds to a change in instrument prices with new BBO prices largely determines his "queue position" in a time-priority market.

Rather than fight for queue position, some market making strategies may seek to post its BBO prices at one price increment "better than" or "inside" the posted BBO prices from other market participants. For example, if the current best bid and offer prices for an instrument are $10.04 and $10.08, respectively, then a market maker may choose to post their BBO prices at $10.05 and $10.07. By doing so, they are first in line to be traded at those prices. They also may trade against "market orders" that arrive seeking to immediately buy or sell at the best prices posted, or they may trade against various types of "hidden" orders that the trading venue provides to market participants seeking to minimize "information leakage" of their desires to buy or sell.

An alternative to time-priority matching policy is pro rata apportionment. In this case, the trading venue divides the matched orders (e.g. future option contracts) among all market participants (usually market makers) at the posted price. Such a policy may induce market making strategies to "join" the BBO prices currently posted on a market, such that its BBO prices are equal to those of other market participants. While queue position is no longer a primary consideration, market makers on pro rata markets continue to have strong incentives to act quickly.

Additional alternative matching policies exist in the marketplace, including a blend of time-priority and pro rata apportionment. Other markets may offer incentives in the form of rebates to establish best bid and offer prices. These incentives provide additional opportunities for market makers to profit with the intent of narrowing spreads.

The largest opportunities to capture the spread occur in volatile markets with concentrations of trading activity and rapidly changing prices. Not only do market makers need to be able to post new BBO prices in order to be present for the fleeting opportunities to trade, they also need to ensure that they cancel or modify their previously posted BBO prices before they create an arbitrage opportunity for a faster market participant.

Arbitrage is another example of a trading strategy that typically depends on speed, and thus it is commonly implemented as an automated trading strategy. Some trading firms may run stand-alone arbitrage strategies, or it may be operated as a complementary part of a market making strategy. An arbitrage trading strategy monitors the prices of financial instruments and identifies opportunities to immediately sell the instrument at a price higher than the price to immediately buy the instrument.

Arbitrage opportunities can be created when a market participant with a resting order or a market maker with a BBO quote is slow to respond to a change in price. For fungible financial instruments that trade across multiple markets, such as equities and equity options in the United States or spot currency pairs in the global foreign exchange (FX) markets, market arbitrage opportunities exist because the financial instrument can be bought at a lower price on one market and sold at a higher price on another market.

Latency arbitrage is closely related whereby an automated trading strategy identifies demand (e.g. incoming orders to buy), quickly trades at the current best price (e.g. buys all shares at the current best bid price), then sets the new best price with a small profit margin (e.g. sells shares to the incoming buy orders at a "tick" higher than they were purchased).

In derivatives markets, the challenges of automated market making and the potential for arbitrage opportunities are amplified for several reasons. Firstly, the price of a derivative instrument generally depends on the price of its underlying instrument. A common example of a derivative is a stock option which is a contractual right, but not the obligation, to buy (a call) or sell (a put) a stock (the underlying) at a defined price (the strike) for a period of time limited by a defined date (the expiration). Due to the large number of permutations of values for each of these parameters, it is common for many, potentially thousands, of options to be tied to a single underlying instrument. Options or their equivalents also exist for futures, foreign exchange, and a variety of credit instruments.

How to arrive at the fair value of an option contract is complex and computationally intensive. The difference between the current price of the underlying financial instrument and the strike price of the option is one consideration. Because the price of the underlying financial instrument can and will move after the option contract is traded, the volatility of the price of the underlying financial instrument is another consideration. Because the contract exists for a defined period of time, interest rates are another consideration, as well as if the contract allows the holder to exercise (buy/sell) at any time prior to the expiration (e.g. an American stock option) or only on the date of expiration (e.g. a European stock option).

Various option pricing models are known in the art or used in a proprietary manner for computing theoretical option prices. Prominent among these models are the Black-Scholes option pricing model and the iterative binomial Cox, Ross, and Rubinstein (CRR) option pricing model. While the Black-Scholes model is computationally far simpler than CRR, it makes simplistic assumptions, lacks support for American exercise, and therefore lacks of precision for many strategies in modern electronic markets. While there are known techniques in the art that dramatically increase the speed of using the CRR model—see, for example, U.S. Pat. Nos. 7,840,482 and 8,843,408—these techniques are still expected to operate 10 to 100 times too slowly for practical use in the latency-critical datapath of automated trading strategies. Even when implemented with reconfigurable logic devices and/or general purpose graphics processing units (GP-GPUs), these techniques are expected to require 1 to 10 microseconds to produce a new theoretical option price; whereas automated trading strategies are expected to require latencies of approximately 100 nanoseconds or less to be effective. Accordingly, improvements in the art are still needed for computing and updating theoretical prices for derivative instruments at sufficiently low latency to make these theoretical prices relevant and helpful for automated trading strategies.

In addition to the complexity of computing fair values and the large number of financial instruments, automated trading in derivatives markets presents additional challenges when the underlying financial instruments are traded on a different market (e.g. stocks on the New York Stock Exchange) and in a different physical location than the derivative financial instruments (e.g. stock options on the Chicago Board Options Exchange). As shown in FIG. 2, updated prices for underlying instruments may be transmitted at time $t_2$ to the location of a derivatives market. An automated trading strategy receives these new prices at time $t_3$. In response, it computes new fair prices for all of the derivatives instruments that it trades. These new fair prices may cause the strategy to update its BBO prices, if it is executing a market making strategy. Note that in derivatives market making, sending new BBO prices for multiple derivatives contracts commonly is referred to as "mass quoting". The market making strategy also may send mass quotes to multiple derivatives trading venues for the same fungible derivative instruments.

Note that the propagation delay of data from the underlying market to the automated trading strategy (i.e. the time elapsed from $t_2$ to $t_3$) in part determines the speed of response of the automated trading strategy. As depicted in FIG. 2, market participants may use data networking technologies, such as "line of sight" wireless network links, to minimize the propagation delay.

New fair price values may also cause the automated trading strategy to identify an arbitrage opportunity. For example, if the strategy determines that the new fair value of the offer price is higher than the current best offer price on the market, it may buy at the current best offer and post a new best offer at the new fair value. Capturing such arbitrage opportunities is frequently termed "aggressing", and these opportunities most frequently arise in fast-moving markets. Many proprietary trading firms use a blend of market making and aggressing strategies.

While firms seek to increase their trading profits by adding aggressing algorithms to their market making algorithms, they also want to defend against the possibility of offering another market participant the opportunity to aggress against its BBO prices. Especially in the case of derivatives market making strategies, it may not be possible for an automated trading strategy to respond to a change in underlying prices by computing new fair prices and sending a message with new mass quotes for thousands of derivative instruments before another market participant is able to send a single message that successfully aggresses against one of those derivatives instruments.

For this reason, automated trading strategies frequently choose to cancel mass quotes or orders when they determine that an undue risk of adverse trades exists. Trading venues typically provide market participants the ability to cancel mass quotes and orders at various granularities. For example, a market maker may have the ability to cancel mass quotes for all contracts on a common underlying instrument (for ease of references, the financial instrument that is underlying a derivative instrument can be referred to as an "underlying"; and the derivative instrument can be referred to as a "derivative"), for all contracts on a set of underlyings in a category, or simply for all contracts. Mass quote cancellations may also cancel one side (i.e., only the bid or offer price) or both sides of the quote. Similarly, a market participant may cancel a single posted order, all resting orders, or orders for a specific group of contracts.

Another strategy used by firms to capture arbitrage opportunities and minimize risk of losses is hedging. When a firm takes a position by buying or selling a financial instrument, they may buy or sell another financial instrument that mitigates losses due to adverse price changes to their position. For example, if a firm expects the value of a stock to increase and takes a long position by buying at $10 per share, they may immediately buy a put option on the same stock at a strike price of $10. Given that the put option provides the opportunity to sell at the strike price, the firm has the opportunity to sell the stock at the price they purchased it at even if the value of the stock declines. Given that the put option was purchased "at the money" with no immediate profit possible, it likely would be an inexpensive option. For example, if the put option cost $0.30 per share to buy, the firm spent 3% in potential returns for a defense against losses.

Various combinations of financial instruments can be used for hedging, including future options and futures, stock options and stocks, stock options and stock options, futures and stocks, etc. When crafting hedging strategies, firms specify the hedging instrument and the ratio of hedging instrument to buy or sell relative to the new position.

Automated trading strategies typically define market conditions that trigger cancel actions at various granularities. For example, if the price difference between the most recent two trades of an underlying instrument is larger than a configured threshold, the strategy may choose to cancel mass quotes on all contracts tied to the underlying instrument. There may be other conditions, such as a technical outage on the trading venue for underlying instruments, that cause the strategy to cancel all mass quotes and orders for all contracts.

Many firms that engage in automated trading use a "grey box" architecture that utilizes software-based computer automation to execute trading algorithms and allows human traders to monitor and control a number of parameters in real-time, including:

Underlying instruments and derivatives to trade
Algorithms and parameters to apply to each instrument
Estimations of volatility, interest rates, and other parameters that drive fair value calculations
Risk parameters and bounds A diagram of a conventional grey box system for automated trading on a trading venue is shown in FIG. 3. FIG. 4 shows a corresponding conventional grey box system for automated trading where the trading includes trading on a derivatives trading venue. A first software-driven component, labeled as the User Terminal, Visualization system in FIGS. 3 and 4, enables a human trader to perform the monitoring and control functions highlighted above. This may be used by a trader to operate a second software component, labeled as the Command and Control system in FIGS. 3 and 4.

The Command and Control system serves as an interface hub between User Terminal, Visualization systems (likely deployed in corporate offices) to a third software component, labeled as Trading Logic in FIGS. 3 and 4, where this Trading Logic software is deployed in colocation data centers. The systems of FIGS. 3 and 4 marshal monitoring information back to traders and operators. Likewise, the systems of FIGS. 3 and 4 pass the "grey box" parameters listed above to the Trading Logic software.

An Instrument Database tracks the universe of financial instruments available for trading, along with trading venue rules for trading them. For example, when a new publicly-traded company executes an Initial Public Offering (IPO) a new stock is added to the Instrument Database. When a publicly-traded company is delisted from an exchange, an entry for the stock on the specific exchange may be removed from the Instrument Database.

For derivatives trading strategies, the Instrument Database tracks the universe of derivatives contracts available for trading, along with trading venue rules for trading them. Since derivatives contracts are frequently created and expire, this universe is dynamic. Furthermore, trading venues typically establish rules such as the minimum price increment for market maker quotes (i.e. the "tick size") and how various types of auctions function. This information is made available to the Command and Control system to allow users to select from a relevant menu of instrument to trade. It is also made available to the Trading Logic software to govern the generation of quotes and orders.

The Trading Logic software implements a specified algorithm or a combination of algorithms as directed by the Command and Control system. The algorithms may be drawn from the set of market making, aggressing, hedging, and canceling strategies described above. The integration of market making, aggressing, and canceling strategies for derivatives trading is commonly referred to as "volatility trading," as trading revenues increase as the frequency of asset price changes increase. Importantly, trading revenues can be independent of the direction in which asset prices move.

Volatility trading represents one of the most computationally intensive forms of automated trading due to large number of financial instruments, the need to perform fair value calculations for each derivative instrument in order to drive trading logic, and the complexity of each of those fair value calculations. Furthermore, volatility trading strategies face more risk of adverse trades from aggressing orders of other market participants. They must also keep tight risk controls on the number of outstanding aggressing orders.

In a conventional approach to automated trading, most trading firms implement in software all of the components in the automated trading systems of FIGS. 3 and 4. These systems typically operate with tick to trade latencies of five to ten microseconds (one millionth of a second). With these types of systems, which are widely deployed for trading underlying financial instruments, the result is derivatives markets that in aggregate change prices tens to thousands of times more often due to the number of contracts linked to a single underlying. Accordingly, these conventional software-based approaches to automated trading are not adequate for automated trading of derivatives because these conventional software-based approaches are not sufficiently fast. That is to say that these conventional software-based approaches to automated trading suffer from a technical shortcoming in that they are not able to adequately take into consideration up-to-date pricing information for swiftly changing market conditions in derivatives markets.

In an alternate approach, the Feed Handler component of the system may be implemented in hardware such as a field programmable gate array (FPGA), while the other system components including the Trading Logic are implemented in software executed by one or more GPPs. Examples of FPGA-based Feed Handlers are described in U.S. Pat. Nos. 7,921,046 and 8,762,249, the entire disclosures of which are incorporated herein by reference. While the use of FPGA-based Feed Handlers constitutes a significant improvement over systems that implement the full cycle in software, such alternate approaches still suffer from relatively high tick to trade latencies due to the latency present in the software-based Trading Logic.

The inventors herein believe that a need in the art exists for automated trading strategies that operate 10 to 100 times faster than what is achievable in software running on general purpose processors (GPPs). For derivatives trading strategies, there also exists a need to compute the fair value of derivatives contracts 10 to 100 times faster than known methods in the art to compute a CRR model.

Faster methods and systems would enable automated trading strategies that maximize profitable opportunities and minimize risks of adverse trades due to mispriced quotes and orders. Without such faster methods and systems, trading firms may take steps to reduce the number of derivatives contracts they trade, post BBO prices with wider spreads, or use more conservative parameters for canceling quotes and orders. All of these steps undesirably result in reduced opportunities to trade and may eliminate incentives to trade in certain contracts or markets.

As technical solutions to the above-described technical shortcomings in the art, the inventors disclose a number of example embodiments that integrate and re-engineer the trading logic for automated trading in coordination with the feed handlers and market gateways to operate on computational resources that are capable of providing highly parallelized and pipelined processing operations to improve tick to trade latency. As examples, a field programmable gate array (FPGA) or application-specific integrated circuit (ASIC) can be used as the processing resource on which automated trading logic is deployed in order to reduce tick to trade latency. However, it should be understood that other types of processors that provide sufficient granularity of parallel operations (data-level and functional parallelism) and speed may also be used. With the availability of the massive parallelism that is available on such chips, the trading logic in coordination with the feed handlers and market gateways can then be re-engineered to take advantage of this parallelism. To do so, the feed handlers, market gateways, and trading logic can be deployed on the logic resources of the chip (which are capable of operating in parallel with other) to serve as automated trading engine. In this fashion, different logic resources of the chip can carry out different parts of the feed handlers, market gateways, and trading logic at the same time. For example, one set of logic resources for the automated trading engine can be scheduling a transmission of a quote or an order for Instrument A to a trading venue while at the same time another set of logic resources for the automated trading engine can be computing theoretical BBO prices for Instrument B. Still another set of logic resources for the automated trading engine can be evaluating multiple canceling conditions in parallel. And yet another set of logic resources for the automated trading engine can be evaluating aggressing conditions.

Furthermore, given the limitations imposed by trading venues on the number of messages per second that may be transmitted by a market participant, conventional GPP-based trading strategies must do one of the following, all of which increase tick-to-trade latencies and thus reduce trading opportunities and increase risk:

(1) perform trade decision-making and message scheduling serially on a single GPP platform
(2) perform trade decision-making in parallel on multiple GPP platforms and then multiplex messages to the trading venues through another platform that performs scheduling and aggregate risk checks By contrast, by leveraging the parallelized logic resources of the FPGA or ASIC, the ability of the automated trading engines described herein to assess all aspects of a trading strategy in parallel and make fine-grained scheduling decisions on the messages to be sent or queued on the network link to the trading venue allows for example embodiments of the invention to lower risk and increase potential trading opportunities.

By operation in the parallelized and pipelined manners described herein, the automated trading engines disclosed herein can be capable ingesting new market events at the maximum rate of the network interfaces to and from trading venues and produce tick to trade latencies that are less than 1 microsecond—for example tick to trade latencies of around 50 nanoseconds to 500 nanoseconds. As examples, tick to trade latencies of 100 ns, 150 ns, 200 ns, 250, ns, 300 ns, 350 ns, 400 ns, 450, ns, or 500 ns or less can be achieved. Moreover, the automated trading engines disclosed herein can operate at sustained throughputs of over 10 million messages per second. This represents a dramatic technical improvement over the above-described conventional approaches to automated trading which are believed to operate at tick to trade latencies of around five to ten microseconds.

With such a dramatic reduction in tick to trade latency, the automated trading engines disclosed herein are capable of operating with derivatives while taking into consideration changes in pricing for the financial instruments that underly such derivatives (where the pricing of such underlying financial instruments may be changing more than one million times per second). The inventors believe that such levels of responsiveness for automated trading strategies are simply not something that conventional automated trading systems are technically capable of achieving. Examples of automated trading strategies that can be used for derivatives with example embodiments disclosed herein include market making strategies (such as basic market making, joining market making, bettering market making, and/or combinations thereof), aggressing strategies, hedging strategies, and/or canceling strategies.

As additional technical solutions to the above-described technical shortcomings in the art, the inventors disclose techniques for computing theoretical fair prices of derivatives at dramatically lower latencies than other approaches known in the art. As explained above, techniques such as Black-Scholes or CRR for computing the fair market price of an option can be unduly slow due to the large numbers of iterations that are needed by these techniques to arrive at theoretical fair market prices. For example, the computational latency for computing theoretical fair market prices of a derivative using the Black-Scholes or CRR models will be on the order of one to ten microseconds. Accordingly, by the time these conventional techniques are able to arrive at a theoretical fair market price, it is almost certain that the pricing for the financial instrument underlying the derivative has changed, in which case the computed theoretical fair market price will be stale and may not accurately reflect market conditions (and a trading strategy that relies on such theoretical fair market price computations will be carrying risks that arise from potential mispricing).

To reduce the latency of computing theoretical fair market prices for derivatives, the inventors disclose a computational approach where the theoretical fair market prices for a derivative (which in turn can drive the trading strategies, BBO prices for quotes, exclusion boundaries for market making quotes, and/or aggressing boundaries for aggressing orders) are extrapolated through parallelized and pipelined computations from a feed of "coarse" theoretical fair market prices for the derivative (where these coarse theoretical fair market prices serve as reference prices for the derivative), a feed of "coarse" prices for the financial instrument underlying the derivative (where these coarse underlying prices serve as the reference prices for the underlying that are linked to the derivative's reference price), a feed of "coarse" Greek values for the derivative, and a market data feed that includes real-time pricing for the financial instrument underlying the derivative. The terminology "coarse" in this context refers to a relatively slow refresh rate of these feeds for the reference prices and Greek values relative to the refresh rate of the underlying financial instrument feed. That is, the reference prices for the derivative and the underlying and associated Greek values for the derivative are expected to refresh at a relatively low rate of around one to 100 times per second. By contrast, the market data feed of underlying financial instrument prices is expected to refresh at a much higher rate of around one million to ten million messages per second For highly traded underlying financial instruments, the refresh rate of pricing for a particular underlying financial instrument may be of similar rates to the refresh rate of the underlying market data feed itself. As such, the refresh rate for the market data feed of underlying financial instrument prices will need to be the driver for refreshing the computed theoretical fair market prices of the derivative if real-time theoretical pricing is desired for derivatives. To accomplish this, the extrapolation model for computing theoretical fair market prices of a subject derivative is designed to use a significantly smaller sequence of arithmetic operations than those used by the Black-Scholes or CRR models. As shown by FIG. 7B discussed below, non-iterative and feed-forward logic can be used to compute theoretical fair market prices for derivatives according to the smaller sequence of arithmetic operations. In this fashion, the computational latency for computing theoretical fair market prices of a derivative will be on the order of five to fifty nanoseconds, which is sufficiently fast to keep up with the fast pace of new events in the market data feed of underlying financial instrument prices (and significantly faster than the conventional computational approaches discussed above). By keeping such a close watch over the changing theoretical fair pricing of derivatives, this inventive approach helps traders greatly reduce the uncertainty and risk of their automated trading strategies for derivatives.

As still additional technical solutions to the above-described technical shortcomings in the art, the inventors disclose techniques where parallelized computational resources implement a scheduling circuit that can be used to schedule the transmissions of quotes to trading venues. The scheduling circuit can monitor transmission metrics (e.g., transmission rates) with one or more trading venues and then compare these transmission metrics with permitted transmission metric limits with the trading venues to determine when quotes can be transmitted to trading venues for acceptance. Quotes that are awaiting transmission can be stored in a pending buffer, and should new quotes on the same financial instrument arrive at the scheduler while the previous quote on that financial instrument is queued in the pending buffer, the scheduling circuit can overwrite the previous quote with the new quote in the pending buffer to ensure that the newer, more up-to-date quote is the one that gets transmitted to the trading venue. The scheduling circuit can also accommodate various prioritization criteria when deciding how to schedule quotes for transmission to trading venues.

These and other features and advantages of the present invention will be described hereinafter to those having ordinary skill in the art.

BRIEF DESCRIPTION OF THE DRAWINGS

FIG. 7A provides an example of a theoretical price calculation.

FIG. 7B provides a block diagram of an example theoretical price generator circuit.

DETAILED DESCRIPTION OF EXAMPLE EMBODIMENTS

Figure 1:
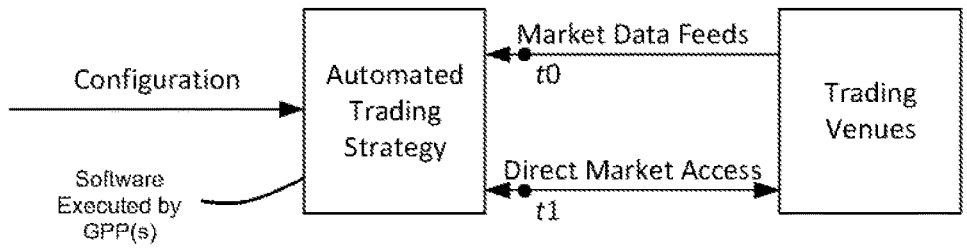
FIG. 1 illustrates an automated trading strategy connected to trading venues via direct market access, consuming market data feeds, and receiving configuration information.
Figure 2:
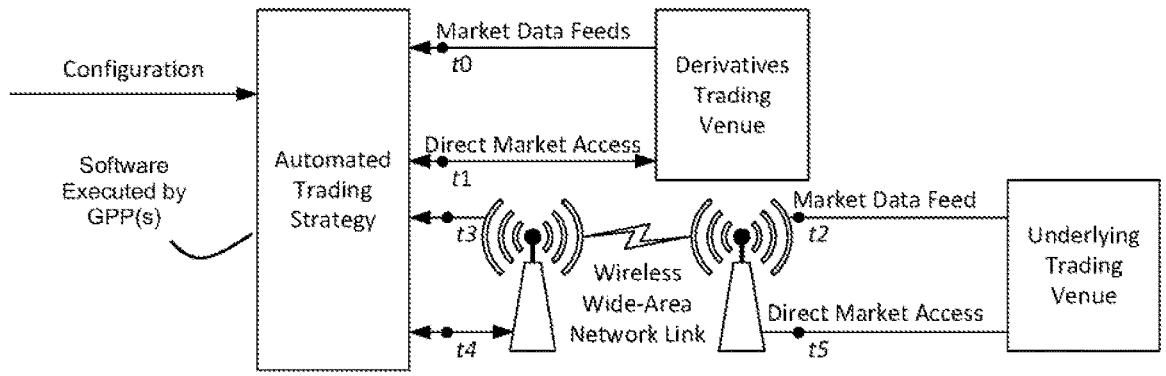
FIG. 2 illustrates an automated trading strategy connected to a derivatives trading venue and a remote trading venue for the underlying instruments via a wireless network link.
Figure 3:
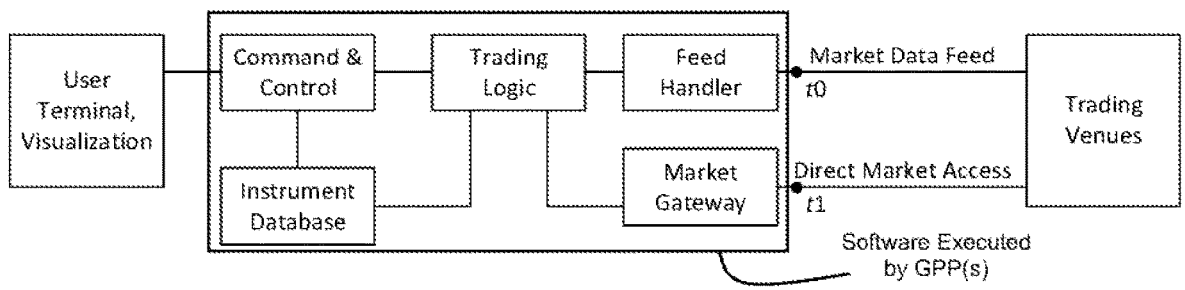
FIG. 3 illustrates an example of a conventional automated trading system in the art.
Figure 4:
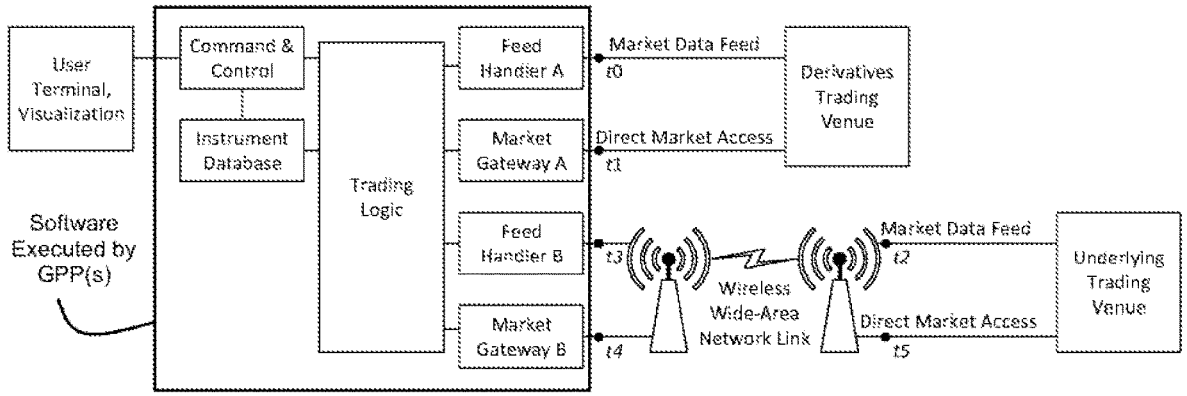
FIG. 4 illustrates an example of a conventional automated trading system that connects to a local derivatives market and a remote market for underlying instruments.

The example embodiments of the invention that are described herein implement automated trading strategies that operate at 10 to 100 times faster than the state of the art by using novel and innovative system architectures and integrated circuits for latency-critical functions. These embodiments may be used for automated trading of any financial instrument by both "buy side" and "sell side" market participants. Relevant buy side market participants include proprietary (or principal) traders who invest their own capital and asset managers (or funds) who invest capital from clients. Relevant sell side market participants include brokers, both institutional and retail, and banks.

While the automated trading techniques described herein can be used to support trading of financial instruments such as stocks, it should be understood that they are particularly useful for supporting trades in derivative financial instruments Trading derivatives, such as stock options and future options, are the most computationally intensive use cases, and the examples discussed below describe applications to automated trading of derivatives.

The automated trading strategies described herein can be deployed as an automated trading engine on a processor having parallelized computational resources.

As an example, a reconfigurable logic device such as an FPGA would be suitable for use as the processor on which the automated trading strategy is deployed. As used herein, the term "reconfigurable logic" refers to any logic technology whose form and function can be significantly altered (i.e., reconfigured) in the field post-manufacture. This is to be contrasted with a general purpose processor (GPP), whose function can change post-manufacture, but whose form is fixed at manufacture. As used herein, the term "general-purpose processor" (or "GPP") refers to a hardware device having a fixed form and whose functionality is variable, wherein this variable functionality is defined by fetching instructions and executing those instructions, of which a conventional central processing unit (CPU) is a common example. Exemplary embodiments of GPPs include an Intel Xeon processor and an AMD Opteron processor. Furthermore, as used herein, the term "software" refers to data processing functionality that is deployed on a GPP or other processing devices, wherein software cannot be used to change or define the form of the device on which it is loaded. By contrast, the term "firmware", as used herein, refers to data processing functionality that is deployed on reconfigurable logic or other processing devices, wherein firmware may be used to change or define the form of the device on which it is loaded. With an FPGA, the firmware can take the form of a configuration file (or bit file) that defines the gate level hardware configurations for the FPGA that will implement massively parallelized processing functionality defined by the firmware. Such configuration files (bit files) can be compiled from VHDL or Verilog code prepared by a designer and maintained in a non-transitory computer-readable storage medium (such as computer memory). These configuration files (bit files) can then be made available for loading onto an FPGA through either a local connection to the FPGA or a networked connection to an FPGA.

As another example, an ASIC would be suitable for use as the processor on which the automated trading strategy is deployed. With the ASIC, massively parallel logic resources can be hardwired into the ASIC chip to support the trading strategies described herein.

Examples of trading strategies that can be deployed in the automated trading engine include market making strategies, aggressing strategies, hedging strategies, and/or canceling strategies (including any combination thereof). More detailed examples of these trading strategies as implemented in an automated trading engine are described below.

Figure 5:
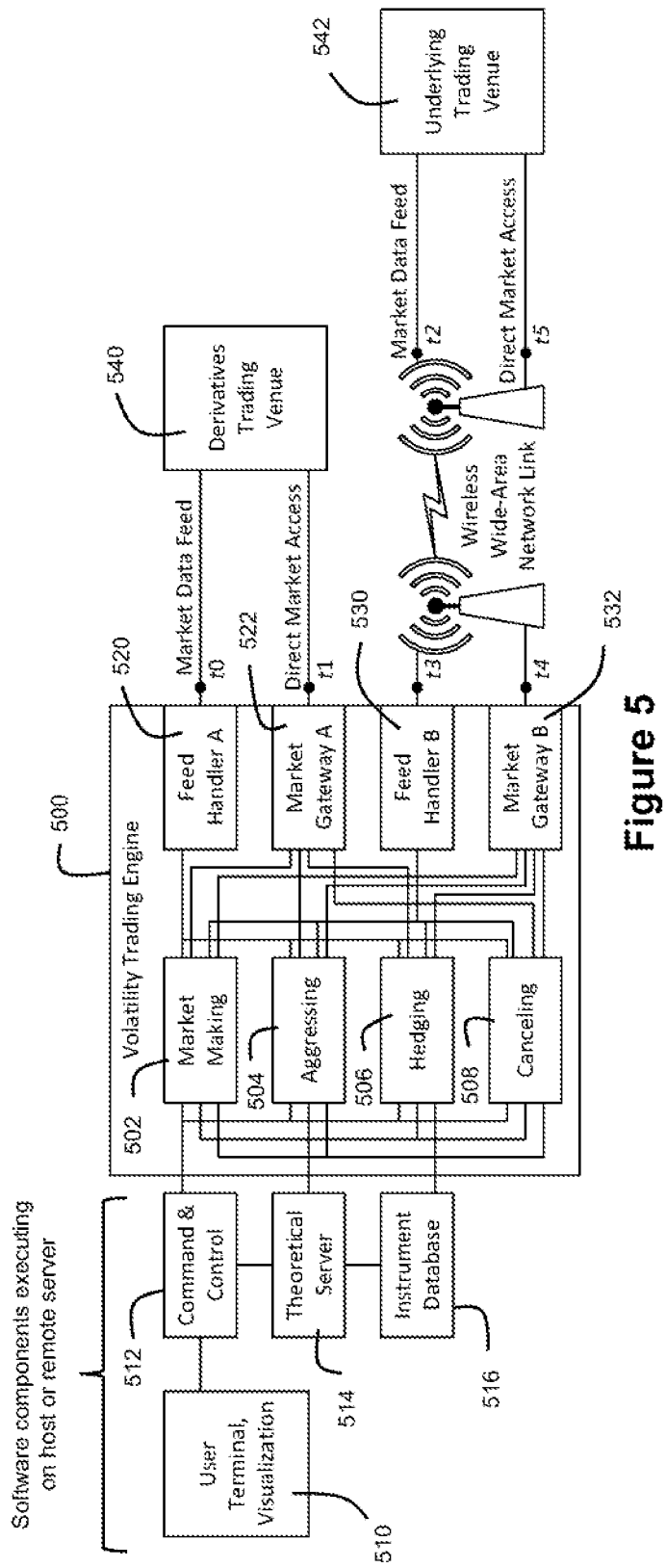
FIG. 5 provides a block diagram of an example embodiment of a volatility trading engine that connects to a local derivatives market and a remote market for underlying instruments.

FIG. 5 is a block diagram of an example embodiment for automated trading of derivatives by a buy side firm, commonly referred to as volatility trading. The primary element of this embodiment is an automated trading engine in the form of the Volatility Trading Engine (VTE), where the VTE performs the latency-critical functions of the automated trading platform as an integrated circuit using parallel logic resources deployed on a chip 500 such as an FPGA or ASIC as discussed above. As noted above, other forms of computing devices that provide sufficient granularity of parallel operations (data-level and functional parallelism) and speed may be used as chip 500 if desired by a practitioner. The VTE interfaces to one or more electronic financial markets, as well as other components of the automated trading platform.

Figure 16:
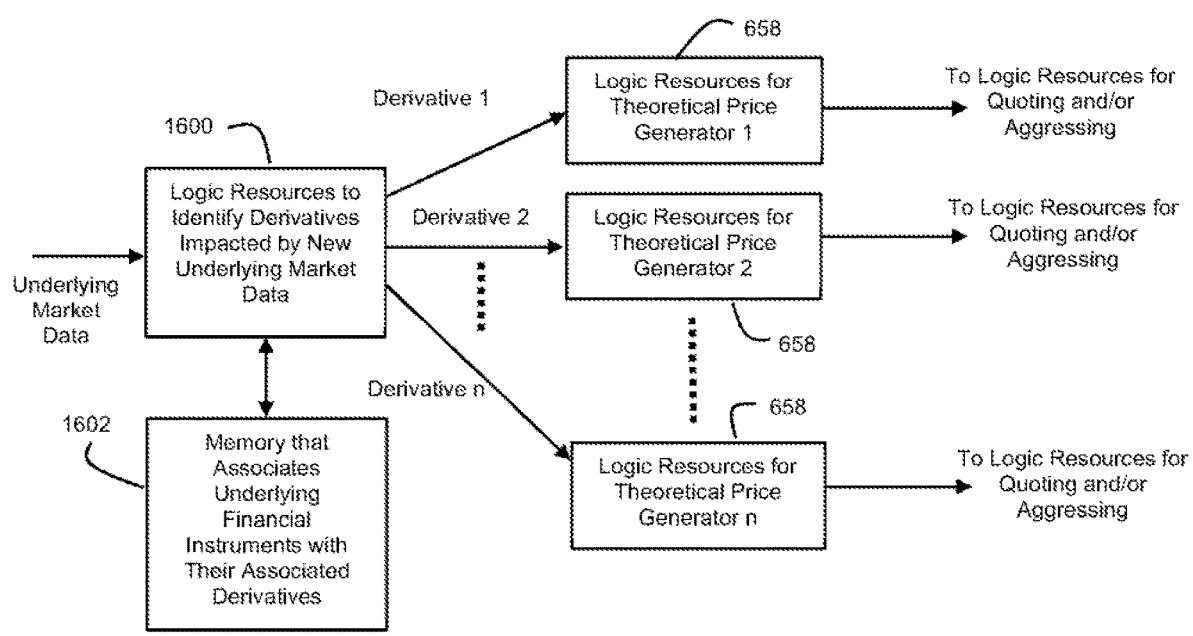
FIG. 16 shows an example of parallelized logic for computing theoretical fair prices of different derivatives in parallel.

The automated trading engine can leverage the parallel logic resources of the chip 500 to deploy a number of parallel instances of its computational and decision-making logic for operation in parallel with each other. For example, there can be multiple parallel instances of the Theoretical Price Generator component 658 discussed below (e.g., see FIGS. 6D, 7B, 8B, 13B, and 13D), and these parallel instances of the Theoretical Price Generator 658 can operate on data for different derivatives at the same time. An example of this is shown by FIG. 16 where parallel instances of the logic resources 658 for computing theoretical fair prices for derivatives operate on different derivatives that have been identified as being impacted by new market data for an underlying financial instrument via logic 1600. This type of parallelization helps the automated trading engine handle workloads that are produced when a given update (e.g., a new price for an underlying financial instrument) triggers the need to compute new theoretical prices for multiple derivatives. For example, there may be a number of different derivatives that are based on Acme stock (say, 50 derivatives). When a new price is received in the underlying market data feed for Acme stock, this can trigger the automated trading engine to compute new theoretical prices for 50 different derivatives. Rather than sequentially computing new theoretical prices for each of these 50 derivatives, the automated trading engine can deploy a number of parallel instances of the Theoretical Price Generator 658 so several of the theoretical prices for different derivatives can be computed at the same time. A practitioner can choose how many parallel instances of a given circuit component such as the Theoretical Price Generator 658 should be deployed in the automated trading engine based on any of a number of considerations. For example, the number of different messages that can be combined in a packet for transmission to a trading venue could drive the choice of how many parallel instances of a circuit component to deploy on the chip 500. Thus, if the trading venue permits 10 messages to be combined in a single packet transmission to that trading venue, then a practitioner may find it desirable to deploy 10 parallel instances of relevant circuit components. In this scenario, if some underlying price changes only trigger the need to update (say) 5 derivatives, then some of the parallel instances of the Theoretical Price Generator 658 may be idle during operation of the automated trading engine. Similarly, if some underlying price changes trigger the need to update more than 10 derivatives, then the automated trading engine can push the workload through the parallel instances in sequenced groups. Buffers can reside on the chip 500 between the circuit components of the automated trading engine to hold the data values being passed from component to component.

Furthermore, different components of the automated trading engine can operate in a pipelined manner, in which case the automated trading engine may include one or more pipelines within it. Moreover, the logic resources that implement the various circuit components of the automated trading engine may be internally pipelined if desired by a practitioner.

Further still, the chip 500 can include on-chip memory resources in which various data items that are to be considered by the automated trading pipeline are stored for fast access by the chip's logic resources. For example, as discussed below, memory on the chip 500 can store underlying prices extracted from underlying market data (e.g., see 656 in FIGS. 6D, 8B, 13B, and 13D), pricing and configuration parameters (e.g., see 660 in FIGS. 6D, 8B, 13B, 13D, and 15B), posted quotes (e.g., see 664 in FIGS. 6D and 8B), quoting boundaries for governing joining and bettering market making strategies (e.g., see 852 in FIG. 8B), quote prices extracted from derivatives market data (e.g., see 854 in FIG. 8B), order books from derivatives market data (e.g., see 1354 in FIGS. 13B and 13D), aggressing boundaries for governing aggressing strategies (e.g., see 1352 in FIGS. 13B and 13D), and/or canceling boundaries for governing canceling strategies (e.g., see 1554 in FIG. 15B).

In the example embodiment of FIG. 5, the VTE includes four configured algorithm engine components that define automated trading strategies for the automated trading engine—Market Making 502, Aggressing 504, Hedging 506, and Canceling 508. Example embodiments for implementing these automated trading strategies on the chip 500 will be discussed below. It should be understood that the VTE may employ any combination of these automated trading strategies as desired by a practitioner. Similarly, a practitioner may choose to deploy only one of these automated trading strategies on the chip 500 if desired.

Feed Handlers:

For each market that the VTE consumes real-time market data from, a Feed Handler component processes the message stream and extracts the fields required by the configured algorithm engine and market gateway components (e.g., see 520, 522 in FIG. 5). In an example embodiment, a Feed Handler only extracts the fields required by the configured algorithm engines and market gateways, ignoring other content in the market data feed packets and their concomitant messages. Also in an example embodiment, a Feed Handler only stores information required for it to perform its parsing function, which means the algorithm engine and market gateway components would maintain records for any market data information they need to perform their functions.

Alternative embodiments may configure the Feed Handler components to store all market data information required by the configured algorithm engine and market gateway components. Since the algorithm engine and market gateway components all function in parallel within the VTE engine, such a Feed Handler should provide sufficient access bandwidth to the stored market data information to service simultaneous requests by multiple components without causing a component to delay processing while it waits for requested market data information to return. The example embodiment eliminates this implementation challenge by parallelizing the storage of required market data information by each algorithm engine and market gateway component that requires it.

Examples of feed handlers that can be deployed on massively parallelized computational resources such as an FPGA and produce streams of normalized market data fields are described in the above-referenced and incorporated U.S. Pat. Nos. 7,921,046 and 8,762,249.

In the example of FIG. 5, two Feed Handler components are configured in the Volatility Trading Engine—one for a local derivatives market (Feed Handler A 520) and one for a remote underlying market (Feed Handler B 522). It should be understood that additional Feed Handlers may be deployed on the chip 500 if desired by a practitioner to accommodate feeds from additional trading venues. Note that underlying financial instruments may trade on the same market as the derivatives instruments (e.g. the Chicago Mercantile Exchange's Globex market for futures and future options). Furthermore, some simple derivatives trading strategies may only require market data from one market, either the underlying market or the derivatives market.

Market Gateways:

For each market that the VTE trades upon, a Market Gateway component interfaces to the market via direct market access (DMA) and sends orders to buy and sell or mass quotes to establish best bid and offer prices (e.g., see 530, 532 in FIG. 5). In an example embodiment, a Market Gateway establishes and maintains connectivity to the configured market according to the market's DMA protocols. For messages sent to the market, the Market Gateway formats the messages according to the market's DMA protocols, allowing internal algorithm engine components to use internal message formats that minimize the latency of passing information to and from the Message Gateway.

For messages received from the market, the Market Gateway extracts the fields required by the configured algorithm engines and market gateways, ignoring other content in the DMA protocol packets and concomitant messages. Also in an example embodiment, a Market Gateway only stores information required for it to perform its formatting and parsing functions, which means algorithm engine components would need to maintain records for any DMA information required to perform its function. DMA information for a trading strategy may include its posted best bid and offer prices and sizes (mass quote) for a given financial instrument, the list of all posted mass quotes for all derivatives on a given underlying financial instrument, the status of an order to buy or sell a given financial instrument (e.g. has a limit order been accepted by the exchange yet?), the number of mass quotes transmitted to the market in the past second or minute, the number of cancellation messages transmitted to the market in the past second or minute, and the round-trip-time (latency) of order transmission to acknowledgement from the market.

Alternative embodiments may configure the Market Gateway components to store all DMA information required by the configured algorithm engine components. Since the algorithm engine components all function in parallel within the VTE engine, such a Market Gateway should provide sufficient access bandwidth to the stored DMA information to service simultaneous requests by multiple components without causing a component to delay processing while it waits for requested DMA information to return. The example embodiment eliminates this implementation challenge by parallelizing the storage of required DMA information by each algorithm engine component that requires it.

Examples of message parsing, message generation, and order functionality for the Market Gateways that can be deployed on massively parallelized computational resources such as an FPGA and produce streams of normalized market data fields are described in the above-referenced and incorporated U.S. Pat. Nos. 7,921,046 and 8,762,249 as well as U.S. Pat. No. 10,037,568, the entire disclosure of which is incorporated herein by reference.

In the example of FIG. 5, two Market Gateway components are configured in the Volatility Trading Engine—one for a local derivatives market (Market Gateway A 530) and one for a remote underlying market (Market Gateway B 532). It should be understood that additional Market Gateways may be deployed on the chip 500 if desired by a practitioner to accommodate connections with additional trading venues.

Operational Control of the VTE:

In the example embodiment of FIG. 5, the financial instruments to trade, the algorithm to use, and the configuration parameters that dictate the algorithm engine's behavior and its configuration parameters can be defined by a user via the User Terminal Visualization component 510. The interface provided to users may include listings of financial instruments available for trading pulled from the Instrument Database 516 and current pricing parameters from the Theoretical Server 514. In response to user input, the Command & Control component 512 sends messages containing the configuration information to the VTE.

The example embodiment of FIG. 5 as used for derivatives trading includes a Theoretical Server 514. The Theoretical Server 514 continuously computes pricing parameters that are used by the configured algorithm engine components of the VTE. Fair value of derivatives instruments may be computed by a number known techniques, including the Cox Ross Rubenstein (CRR) binomial model or proprietary models developed by the user. Typically, these models require input values such as a short-term interest rate. These parameters may be drawn from an external or proprietary data source. The refresh rate for the pricing generated by the Theoretical Server 514 will be relatively low due to the time it takes the Theoretical Server 514 to generate its pricing. For this reason, as discussed above, the theoretical derivative prices generated by the Theoretical Server 514 can be referred to as coarse reference theoretical derivative prices. The Theoretical Server 514 can also track the reference underlying price that was used to compute the reference theoretical derivative price. This reference underlying price can be included as part of the pricing parameters for its subject derivative, and the VTE can use this information to facilitate computation of real-time heoretical fair prices for derivatives using the techniques discussed below. As discussed above and below, these coarse reference prices can be used by the VTE to drive low latency computation of theoretical fair prices for derivatives.

In addition to computing a fair value for each derivatives instrument, the Theoretical Server 514 can also compute parameters that describe the relationship between the prices of underlying instruments and their derivative instruments. These parameters primarily describe the magnitude of change in a derivative's price relative to a change in the price of the underlying instrument. These parameters include:

The rate of change between the derivative price relative to the underlying price (Delta), The rate of change between the derivative price and time (Theta), The rate of change between a derivative's Delta and the underlying price (Gamma), The rate of change between a derivative's price and the underlying instruments implied volatility (Vega), and The rate of change between a derivative price relative to a change in interest rates (Rho).

These parameters are commonly referred to as the "Greeks". An embodiment may compute additional parameters describing relative price changes of a derivative instrument, such as the leverage ratio of a derivative relative to the derivative's price (Lambda).

As discussed below, one or more of these Greeks (e.g., the Delta or δ) can be used to drive the real-time computation of theoretical fair prices for a derivative from the reference price and the real-time pricing changes for the financial instrument underlying the derivative.

In an example embodiment, the Theoretical Server 514 attempts to compute a full set of pricing parameters for each enabled derivative instrument for every change to user inputs or change to underlying instrument price reported by a real-time market data feed. Given the aforementioned computational complexity of doing so with sufficient precision and the frequency of updates to underlying asset prices, the Theoretical Server 514 continuously cycles through the set of enabled derivative instruments updating the set of pricing parameters using the latest user inputs and most recent underlying price information from the real-time market data feeds. If multiple changes to either user inputs or underlying price information occur during a cycle of the Theoretical Server 514, the inputs are effectively conflated.

The Command & Control component 512 and the Theoretical Server component 514 can be implemented in software for execution by one or more GPPs on the same server that hosts chip 500. Similarly, the Instrument Database 516 can be implemented in memory on this server. The User Terminal, Visualization Component 510 may be implemented by the same or remote server. Furthermore, if desired by a practitioner, the Command & Control component 512, the Theoretical Server component 514, and/or the Instrument Database 516 can be implemented on a server remote from the server that hosts chip 500.

Market Making Strategy:

The Market Making component 502 generates and continuously updates best bid and offer prices (i.e. mass quotes) as directed by the parameter set received from the Command and Control 512, Theoretical Server 514, and Instrument Database 516. The Market Making component 502 implements one or a combination of algorithms for mass quoting, as directed by the parameter set. Examples of different market making strategies that can be employed include basic market making, joining market making, bettering market making, and/or some combination thereof.

Basic Market Making:

A basic market making algorithm engine generates new BBO prices for a derivative by directly using the pricing parameters from the Theoretical Server 514 and the current price of the underlying instrument to compute new theoretical BBO prices that are used to generate new quotes for posting with a trading venue.

Figure 6A:
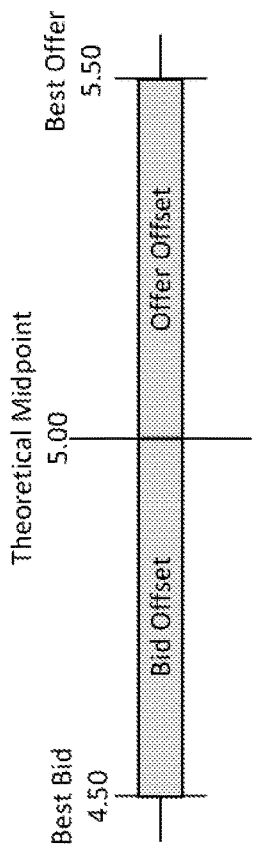
FIG. 6A provides an example of a basic market making scenario based on a theoretical midpoint price.

FIG. 6A provides an example of a basic market making scenario that uses a theoretical midpoint price and offset parameters. The theoretical midpoint price is computed using the midpoint price (the average of the bid and offer prices) for the underlying instrument. The bid price is determined by subtracting a bid offset from the theoretical midpoint price. Likewise, the offer price is determined by adding an offer offset to the theoretical midpoint price. Optionally, the bid and offer offsets may be a single offset value. The offset values are specified as a configuration parameter and serve to ensure a minimum spread (or "edge") for the BBO prices posted by the market making algorithm.

Figure 6B:
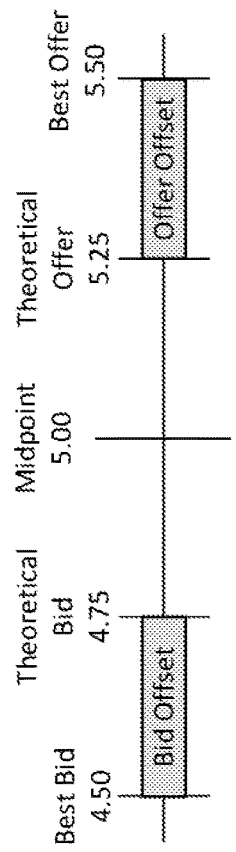
FIG. 6B provides an example of a basic market making scenario based on theoretical bid and offer prices.

FIG. 6B provides an example of a basic market making scenario that uses a theoretical bid and offer prices and offset parameters. The theoretical bid price is computed using the bid price for the underlying instrument. The bid price for quoting is determined by subtracting a bid offset from the theoretical bid price. Likewise, the theoretical offer price is computed using the offer price for the underlying instrument. The offer price for quoting is determined by adding an offer offset to the theoretical offer price. Optionally, the bid and offer offsets may be a single offset value. Independently computing theoretical prices for the bid and offer can help defend against erroneous values for underlying instruments due to data loss or other errors in the market data feeds.

Figure 6C:
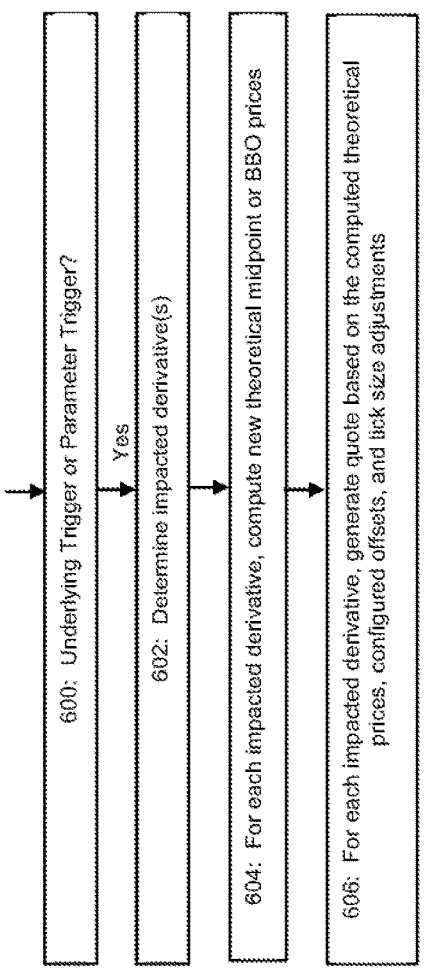
FIG. 6C provides an example of pipelined logic for carrying out basic market making.

FIG. 6C provides an example of pipelined logic for carrying out basic market making. The operations of FIG. 6C can be implemented via parallelized logic resources on the chip 500 so that each operation can operate concurrently with the other operations (e.g., see FIG. 16). The pipeline of FIG. 6C ingests and listens for new underlying market data (from one or more underlying trading venues via one or more Feed Handlers) and/or new parameters (from the system's operational control subsystem).

At step 600, an underlying trigger is generated in response to new underlying market data (e.g., a new underlying price) for a financial instrument that underlies a derivative covered by the VTE; or a parameter trigger is generated in response to new parameter data being received from the operational control subsystem.

At step 602, in response to the underlying trigger or parameter trigger, the pipeline determines which derivatives are impacted by the new underlying market data or new parameter (e.g., see 1600 in FIG. 16). This can be accomplished via a lookup in memory that links each underlying instrument with its corresponding derivative(s) (e.g., see 1602 in FIG. 16) and a memory that links each parameter with its corresponding derivative(s). Such memory(ies) can be deployed on-chip for fast access by logic 1600 that performs step 602. As noted above, it should be understood that a given financial instrument may underly multiple derivatives covered by the VTE. Similarly, a given control parameter may apply to multiple derivatives covered by the VTE. As such, step 602 can introduce a one-to-many fanout of workload for the pipeline.

At step 604, the pipeline computes new theoretical fair bid and offer prices for each impacted derivative (based on the new underlying price or new parameter). These new theoretical fair bid and offer prices can be used as the BBO prices for a new quote on a subject derivative. Due to the parallelism available on chip 500, the chip's logic resources can accommodate this one-to-many workload as discussed above by deploying multiple copies of the Theoretical Price Generator component 658 discussed below and then using different copies of the Theoretical Price Generator component 658 to compute theoretical prices for different derivatives at the same time (see FIG. 16). Moreover, in situations where a given underlying price change or parameter change triggers a need to update a number of derivatives that is greater than the number of copies of the Theoretical Price Generator component 658 on the chip 500, step 602 can also involve prioritizing the ordering of derivatives for processing through the parallel Theoretical Price Generator components. For example, derivatives that are closer to "being in the money' can be prioritized over derivatives that are less close to being in the money. As another example, derivatives that are more frequently traded can be prioritized over derivatives that are less frequently traded. The control parameters from the user can be used to govern such prioritizing approaches.

At step 606, the pipeline, for each impacted derivative, generates a quote with BBO prices that are based on the subject derivative's computed theoretical fair bid and offer prices (as tick size adjusted (discussed below)) if a minimum spread requirement for the derivative is satisfied by the BBO prices. As with step 604, chip 500 can include multiple copies of the logic resources that perform quote generation so that the pipeline can generate multiple quotes in parallel in situations where multiple derivatives are impacted by a given price or parameter update. Moreover, the ability to generate multiple quotes in parallel allows a quote scheduling component (see the Mass Quote Scheduler 666 discussed below) to consider different quotes in parallel when deciding which quotes to prioritize for transmission to a trading venue. Prioritization strategies for such scheduling can be driven by user-defined configuration parameters.

Figure 6D:
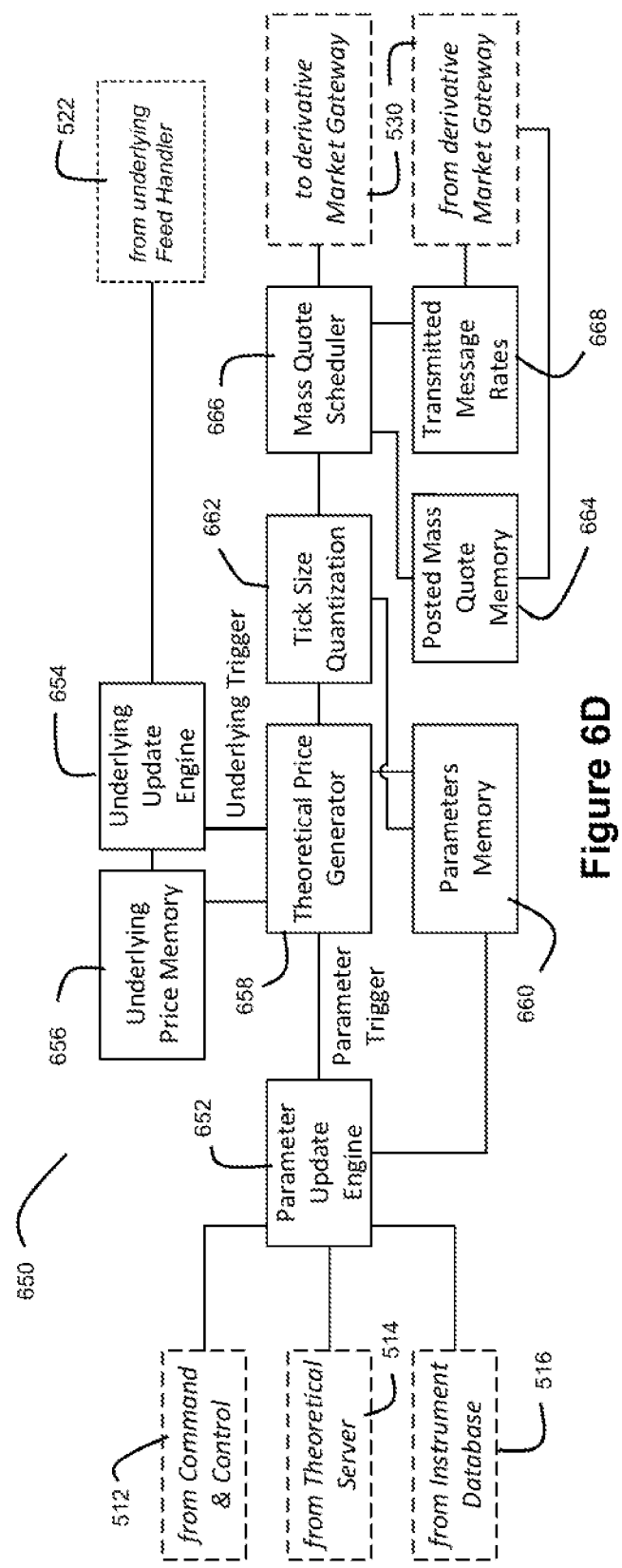
FIG. 6D provides a block diagram of an example basic market making circuit.

An example embodiment of a basic market making circuit 650 is shown by FIG. 6D. The different components of the basic market making circuit of FIG. 6D can be implemented by different sets of parallelized logic resources of the chip 500. In this fashion, the logic resources can operated in a pipelined manner (e.g., the Mass Quote Scheduler 666 can be operating on data for Derivative A while at the same time the Theoretical Price Generator 658 is operating on subsequently received data for Derivative B).

The logic resources of the chip 500 which define the Parameter Update Engine 652 receive updated configuration parameters from Command and Control 512, updated pricing parameters from the Theoretical Server 514, and updated instrument parameters from the Instrument Database 516. The Parameter Update Engine 652 stores these parameters in a Parameters Memory 660 that may also be accessed by other components of the basic market making circuit 650. When the Parameter Update Engine 652 detects a change in any of the parameters that drive the basic market making circuit 650 (e.g., a new reference price for a derivative handled by the VTE, a new Greek value for a derivative handled by the VTE, a new derivative to be handled by the VTE, etc.), it can generate a Parameter Trigger that will drive a re-computation of theoretical fair prices for the subject derivative(s).

Real-time updates for underlying instruments are received by the Underlying Price Memory 656 and Theoretical Price Generator 658 from one or more Feed Handler components 522. The Underlying Price Memory 656 stores the most recent pricing information for all underlying instruments of the enabled derivatives instruments.

Logic resources of the chip 500 that define an Underlying Update Engine 654 can detect whether any of the new prices for an underlying in the incoming stream from the Feed Handler 522 reflect a change in price for that underlying financial instrument. This detection can be accomplished by comparing the stored most recent price for a subject underlying as reflected in and retrieved from the Underlying Price Memory 656 with the new price for that underlying financial instrument from the Feed Handler 522. If an underlying price change is detected, the Underlying Update Engine 654 can generate an Underlying Trigger that will drive a re-computation of theoretical fair prices for the derivatives corresponding to that underlying financial instrument.

Logic resources of the chip 500 that define a Theoretical Price Generator 658 generate new theoretical best bid and offer (BBO) prices for a derivatives contract when notified of a change to underlying instrument prices (the "underlying trigger") or a change to parameters (the "parameter trigger"). Note that an underlying trigger will cause new theoretical bid and offer prices to be generated for each enabled derivatives instrument tied to the underlying instrument. Further note that a parameter change may include enabling trading on a new derivatives instrument or new theoretical pricing parameters from the Theoretical Server.

In an example embodiment, the Theoretical Price Generator 658 generates new theoretical fair prices by implementing a circuit to compute the equation shown in FIG. 7A. First the difference in the current underlying instrument price (from the real-time market data feed) and the reference underlying price (supplied in the pricing parameters from the Theoretical Server) is computed as $\Delta_{underlying}$. This difference is multiplied by $\delta$, the Greek Delta value for the subject derivative that is supplied in the pricing parameters from the Theoretical Server 514. The result is added to the reference theoretical derivative price, $T_{ref}$, that is also supplied in the pricing parameters from the Theoretical Server 514, to form the new theoretical fair price, T. The reference underlying price that is used can be the same underlying price that was used to compute the reference theoretical derivative price.

In an example embodiment, a new theoretical fair price is computed independently for the best bid and best offer prices. FIG. 7B depicts an example embodiment for logic resources to carry out these computations in the circuit 658 (see subtraction logic 702, multiplication logic 704, and sum logic 706). Alternatively, the new theoretical fair price may specify the midpoint price. The theoretical price generator circuit 658 of FIG. 7B is capable producing a "tick to price" latency on the order of around 5 to 50 nanoseconds, which is sufficiently fast to keep up with how quickly underlying prices may change (see Rate 1 in FIG. 7B which may be more than one million times per second). In the example of FIG. 7B, Rate 1 is expected to be (but need not be) faster than Rate 2 (which corresponds to the refresh rate of the coarse reference prices of the underlying and derivative) and Rate 3 (which corresponds to the refresh rate of the Greek—where Rate 3 may be the same as Rate 2). In an example embodiment, the theoretical price generator circuit 658 operates on the most recently received of the current reference prices (for the derivative and its underlying instrument), Greek value, and new underlying instrument price.

The new theoretical fair prices are passed to the Tick Size Quantization circuit 662 that adjusts the theoretical fair prices by the specified offsets (see FIGS. 6A and 6B). This adjustment process can also ensure that the resulting theoretical fair bid and offer prices conform to the tick size rules of the market. For example, a derivatives market may specify that options contracts may only be quoted in increments of ten cents ($0.10). The market may also specify different tick sizes based on price ranges. In addition to the tick size rules for the market, the pricing parameters may specify the logic for adjusting theoretical prices. Example adjustments might be to always round theoretical prices toward or away from the midpoint price. The adjusted BBO prices then serve as the BBO prices for a new quote on the subject derivative and are passed to the Mass Quote Scheduler circuit 666.

The Mass Quote Scheduler 666 transmits mass quote messages to the Market Gateway 530 as quickly as possible, subject to bandwidth limitations of the network connectivity to the trading venue and any rate restrictions imposed by the trading venue. Some trading venues limit the rate that a market participant may transmit various message types such as mass quotes and cancellations. When those rates are exceeded, the trading venues may reject new messages or disconnect the market participant and cancel all posted quotes and orders.

When a quote is able to be transmitted by the Mass Quote Scheduler circuit 666, it is stored in the Posted Mass Quote memory 664. If at a later time the quote is rejected by the trading venue or not acknowledged and accepted within a specified time period, the quote is removed from the Posted Mass Quote memory 664 and passed back to the Mass Quote Scheduler 666. If a more recent Mass Quote update has been successfully transmitted by the Mass Quote Scheduler 666, then no further action is taken. If not, the Mass Quote still represents the most current price for the instrument and the Mass Quote Scheduler 666 transmits the mass quote as soon as possible.

When a quote cannot be immediately transmitted by the Mass Quote Scheduler circuit 666, the Mass Quote Scheduler 666 stores the quote in a pending buffer. The Mass Quote Scheduler 666 can sequence quotes in the pending buffer for transmission according to their order of arrival. If a new quote for the same instrument arrives from the Tick Size Quantization circuit 662 while the previous quote is still in the pending buffer, then the previous quote is replaced by the new quote (and the new quote can retain the previous quote's place in the transmission sequence). The Mass Quote Scheduler 666 drains the pending buffer by transmitting quotes stored therein as quickly as allowed by the constraints of the Market Gateway interface, e.g. link bandwidth or market rate limits.

The Mass Quote Scheduler 666 also can sequence quotes in the pending buffer according to a priority associated with the financial instrument to be quoted. The configuration parameters for the financial instrument may specify the priority explicitly or it may specify a metric that dictates the priority. Example metrics that can be used to define priority include the current trading volume for the subject instrument, the distance of the strike price for an option instrument from the current price of the underlying instrument, or the rate of price underlying price changes for the subject financial instrument. Values for these metrics can be computed and derived from market data that is available from the underlying feed handler 522 and derivatives feed handler 520 as well as reference Greeks from the Theoretical Server 514.

If the size of the pending buffer grows beyond a specified threshold, the Mass Quote Scheduler 666 transmits a cancellation message to the trading venue. This can be done to prevent posted quotes that no longer represent fair values from being executed against by a fast-moving market participant before they are able to be updated due to message rate limitations imposed by the trading venue. The Mass Quote Scheduler 666 then retransmits current quotes for all enabled instruments. Based on parameters entered by the user via Command and Control 512, this action occurs either immediately, after a configured wait period, or after a user enters a manual command.

Joining Market Making

Whereas basic market making sets BBO prices for quotes based on the theoretical prices derived directly from the current prices of the underlying instrument, joining market making seeks to maintain BBO quote prices equal to the current best prices for the subject derivative contract. As previously described, this strategy is commonly used for trading venues that use pro rata apportionment of executed shared among all participants at the best price.

Figure 8A:
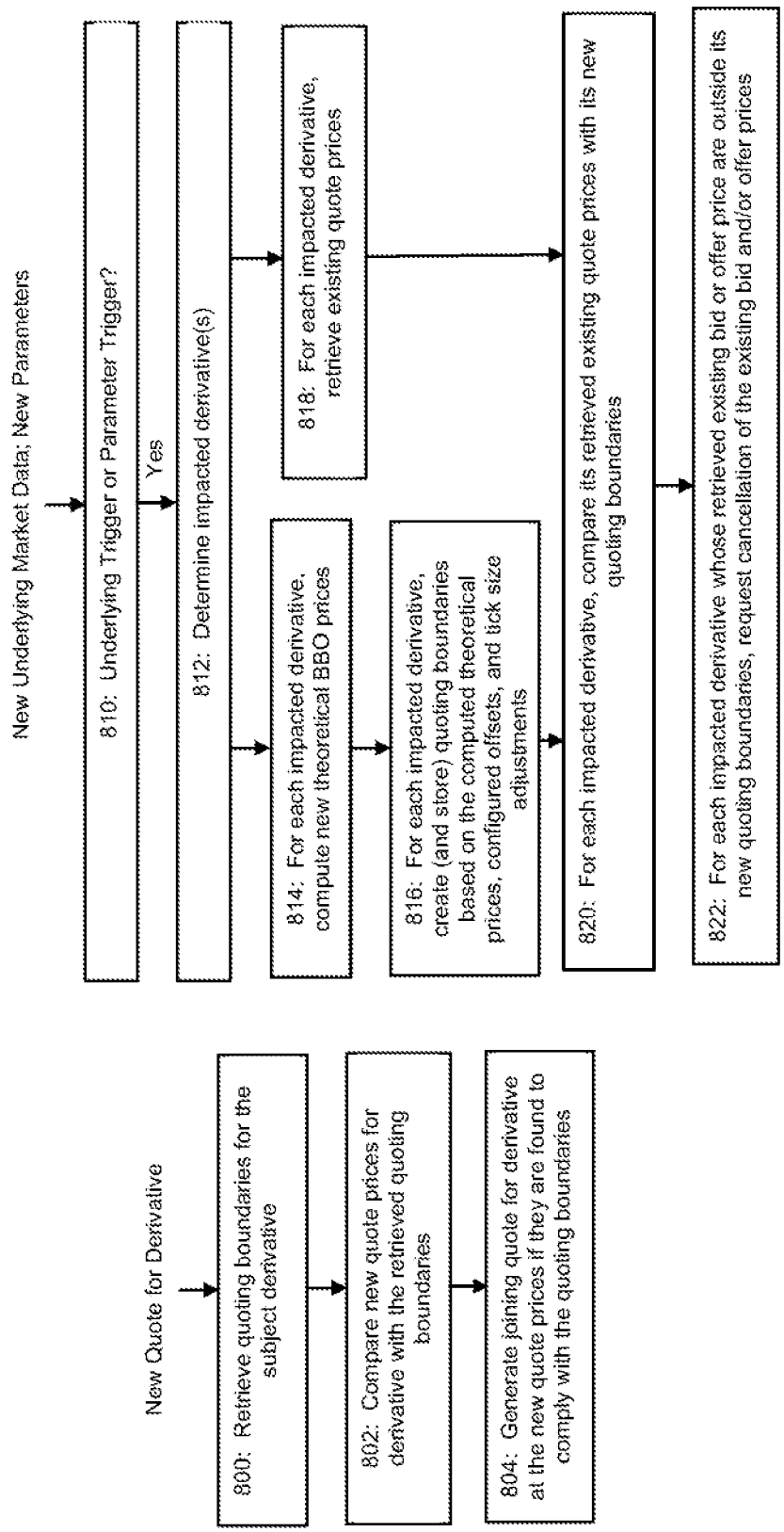
FIG. 8A provides an example of pipelined logic for carrying out joining market making.

FIG. 8A provides an example of pipelined logic for carrying out joining market making. The operations of FIG. 8A can be implemented via parallelized logic resources on the chip 500 so that each operation can operate concurrently with the other operations (e.g., see FIG. 16). The pipeline of FIG. 8A ingests and listens for (1) new quotes for derivatives (from one or more derivatives trading venues via one or more Feed Handlers 520) and (2) new underlying market data (from one or more underlying trading venues via one or more Feed Handlers 522) and/or new parameters (from the system's operational control subsystem). The pipeline can employ roughly two decision paths for handling these inputs—one path for deciding whether to join a market quote and one path for deciding whether market conditions indicate any existing market quotes should be canceled.

For example, when a new quote for a derivative is received, the pipeline will retrieve quoting boundaries for the subject derivative at step 800. These quoting boundaries will control the decision-making as to whether a joining quote should be generated, as discussed below. At step 802, the pipeline compares the new quote pricing with the retrieved quoting boundaries. If the comparison at step 802 results in a determination that the new quote pricing complies with the retrieved quoting boundaries, then the pipeline generates a joining quote at the new quote's pricing.

When new underlying market data or new parameter(s) are received, then steps 810, 812, and 814 operate in a like manner as steps 600, 602, and 604 of FIG. 6A (see also FIG. 16). However, with joining market making, the computed theoretical fair bid and offer prices are used to define the quoting boundaries rather than setting the BBO prices of a new quote. Accordingly, at step 816, the pipeline—for each derivative impacted by the new underlying price or the new parameter(s)—creates (and stores) new quoting boundaries for the subject derivative based on the computed theoretical BBO prices (as tick size adjusted). Furthermore, while these operations are being carried out, the pipeline can also retrieve the existing quote prices for each impacted derivative (step 818) (e.g., see memory 854 in FIG. 8B). Then, at step 820, the pipeline—for each impacted derivative—compares the impacted derivative's retrieved existing quote prices with its newly computed quoting boundaries. If an existing quote's pricing now falls outside the new quoting boundaries, the pipeline will request cancellation of that existing quote (step 822), which permits the VTE to quickly avoid leaving a quote on a market with stale and outdated pricing.

Figure 8B:
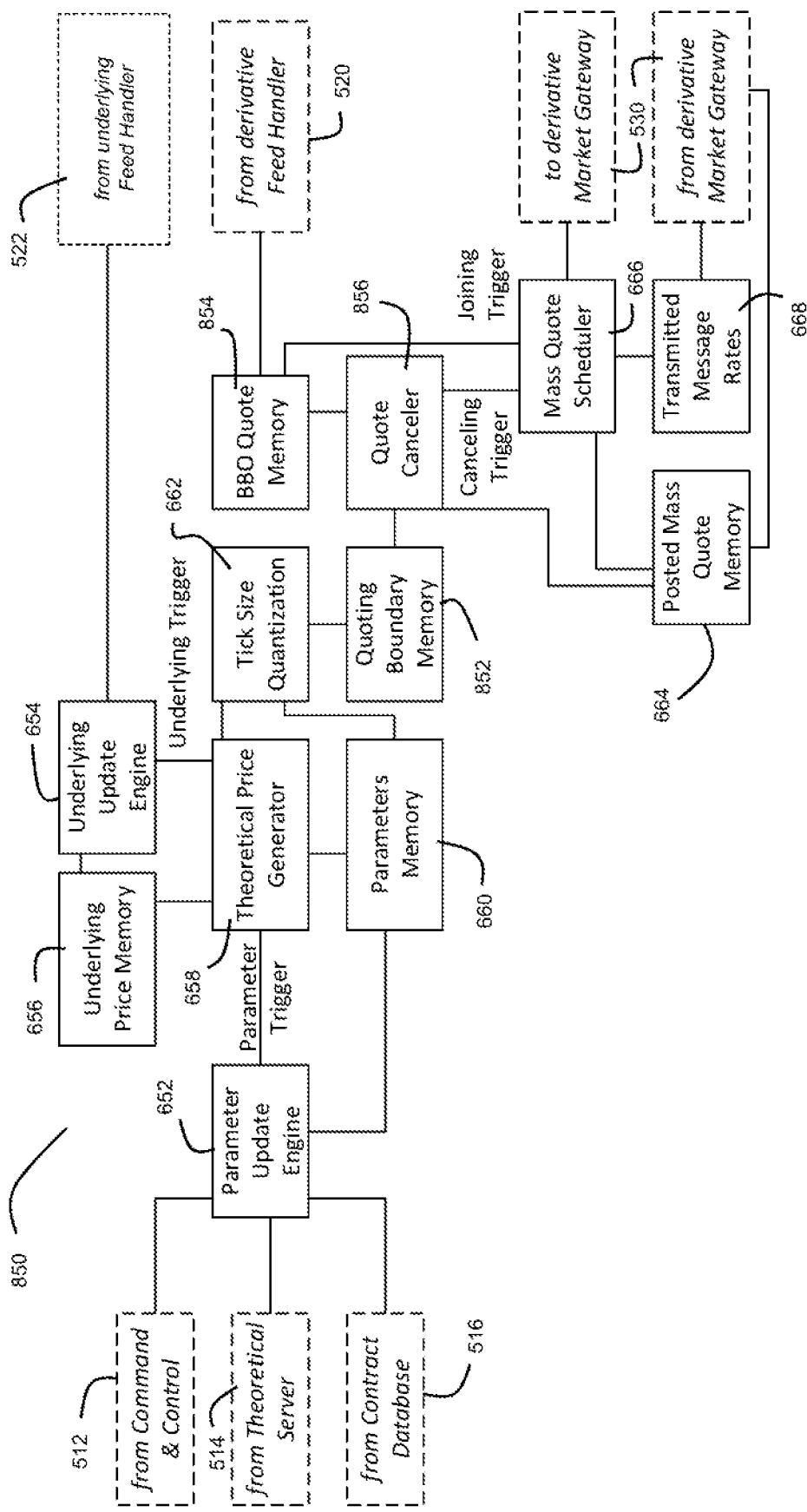
FIG. 8B provides a block diagram of an example joining market making circuit.

An example embodiment of a joining market making circuit 850 is shown by FIG. 8B. The current quote (the BBO prices) for derivatives contracts on the trading venue are received from a real-time market data feed for the derivatives trading venue via a Feed Handler component 520. Updates to the current quote are stored in the BBO Quote Memory 854 and passed to the Quote Canceler 856 and Mass Quote Scheduler 666 as a joining trigger signal. In this fashion, the Quote Canceler 856 and Mass Quote Scheduler 666 are notified that there are new BBO prices for a subject derivative that should be considered for joining in the marketplace.

In the same manner as the basic market making circuit 650, the joining market making circuit 850 includes a Parameter Update Engine 652, Underlying Price Memory 656, Underlying Update Engine 654, Parameters Memory 660, Theoretical Price Generator 658, and Tick Size Quantization circuit 662. These serve the same role of generating new theoretical BBO prices (quote) in response to an underlying trigger or a parameter trigger. The difference in the joining market making circuit 850 is that these prices represent the boundaries of an exclusion range of prices for the joining decision. That is, the newly computed theoretical BBO prices for a subject derivative (as adjusted to fit the tick size requirements of a subject trading venue) are used to define the exclusion zone's quoting boundaries. These new quoting boundaries are added to the Quoting Boundary Memory 852 in association with their subject derivative and are passed to the Quote Canceler circuit 856 as a boundary trigger. The joining market making circuit 850 is configured to not post new quotes for derivatives within the derivatives' exclusion boundaries. Furthermore, the joining market making circuit 850 is also configured to cancel any posted quotes for derivatives whose newly computed theoretical BBO prices (as tick-size adjusted) now fall within the exclusion boundaries for those derivatives. A logic table for this joining/canceling decision-making is below. It should be understood that the logic below applies to the bid price and offer price independently.

| Trigger | Need | Test | Action |
| --- | --- | --- | --- |
| New quote price for a subject derivative is received from market | Does the new quote price for the subject derivative fall within the exclusion boundaries for the subject derivative | Compare exclusion boundaries for the subject derivative that are retrieved from Quoting Boundary Memory with the new quote prices for | If new quote price falls outside the retrieved exclusion boundaries, then generate a quote at the new quote price; Otherwise do not generate a new quote at the new |

-continued

| Trigger | Need | Test | Action |
|---|---|---|---|
| | | the subject derivative | quote price |
| New underlying price for the underlying instrument of a subject derivative is received from market | Compute new exclusion boundaries (based on newly computed theoretical BBO prices that take into consideration the new underlying price) for subject derivative; and compare existing quote for the subject derivative with the new exclusion boundaries | Compare BBO prices for existing quote on the subject derivative that are retrieved from the BBO Quote Memory with the new exclusion boundaries | If retrieved BBO prices fall within the new exclusion boundaries, then cancel the existing quote; Otherwise keep the existing quote |
| New parameter for a subject derivative is received from operational control system | Compute new exclusion boundaries (based on newly computed theoretical BBO prices that take into consideration the new parameter(s)) for subject derivative; and compare existing quote for the subject derivative with the new exclusion boundaries | Compare BBO prices for existing quote on the subject derivative that are retrieved from the BBO Quote Memory with the new exclusion boundaries | If retrieved BBO prices fall within the new exclusion boundaries, then cancel the existing quote; Otherwise keep the existing quote |

In response to a boundary trigger or a joining trigger, the Quote Canceler circuit 856 checks to see if the new BBO prices from the market or the currently posted BBO prices for an existing quote now fall within the exclusion boundaries. If so, the Quote Canceler 856 issues a canceling trigger to the Mass Quote Scheduler 666, which directs the Mass Quote Scheduler 666 to cancel and not join either the best bid, the best offer, or both the best bid and best offer prices for the given derivative contract.

In response to a canceling trigger, the Mass Quote Scheduler 666 immediately generates a mass quote cancelation message and attempts to transmit it to the Market Gateway 530. In an example embodiment, cancellation actions always take precedence over mass quote update actions.

In response to a joining trigger, the Mass Quote Scheduler 666 retrieves the current posted quote values for the associated derivative contract from the Posted Mass Quote Memory 664. If the posted quote prices differ from the received quote prices, then the Mass Quote Scheduler 666 generates a mass quote update message. Note that a coincident cancellation trigger (caused by the same market data update) may override either the best bid or best offer price in the new mass quote message if either price fell within the exclusion boundary and thus was immediately canceled. The new mass quote message would then update the price that remained outside the exclusion boundary to join the new best price on the trading venue. In the case that the coincident cancellation trigger overrides both best bid and offer prices, the action of generating a new mass quote update message is abandoned. Transmission of new mass quote messages to the Market Gateway 530 are governed as previously described in the basic market making circuit 650.

Figure 9:
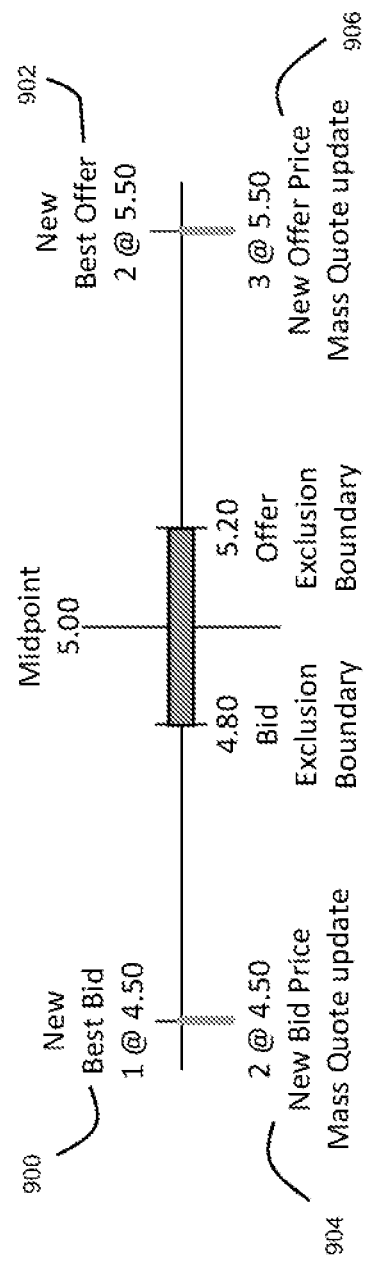
FIG. 9 provides an example of a joining market making scenario.

FIG. 9 provides an example of a joining scenario. For a given derivatives contract, the most recent market data update from the trading venue reports a best bid of one lot at $4.50 (see 900) and a best offer of two lots at $5.50 (see 902). Per the joining logic, the circuit 850 generates a mass quote with a best bid of one lot at $4.50 (which results in there being 2 lots of the quoted best bid price of $4.50—see 904) and a best offer of one lot at $5.50 (which results in there being 3 lots of the quoted best offer price of $5.50—see 906). Note that while the prices are dictated by the joining logic, the number of lots (i.e. amount or size) to post on the bid and offer can be configuration parameters specified by a user that are passed to the joining market making circuit 850 via the Command and Control component 512.

In the example of FIG. 9, the bid and offer exclusion boundary prices generated by the Theoretical Price Generator 658 (as tick size-adjusted by 662) are $4.80 and $5.20, respectively. If a new market update from the trading venue improved the best bid to three lots at $4.85 and two lots at $5.85, then the joining market making circuit 850 can immediately cancel the posted best bid at $4.50 and update the best offer to one lot at $4.85.

Bettering Market Making

Another market making strategy that can be implemented by the VTE is bettering market making. Bettering market making can operate nearly identically to joining market making except that the posted BBO prices for the mass quotes are offset by a specified tick increment "better than" the BBO prices on the trading venue. That is, rather than joining an existing quote on the market, the bettering market making strategy seeks to post a quote with pricing that is one or more specified tick sizes better than that existing quote.

Figure 10A:
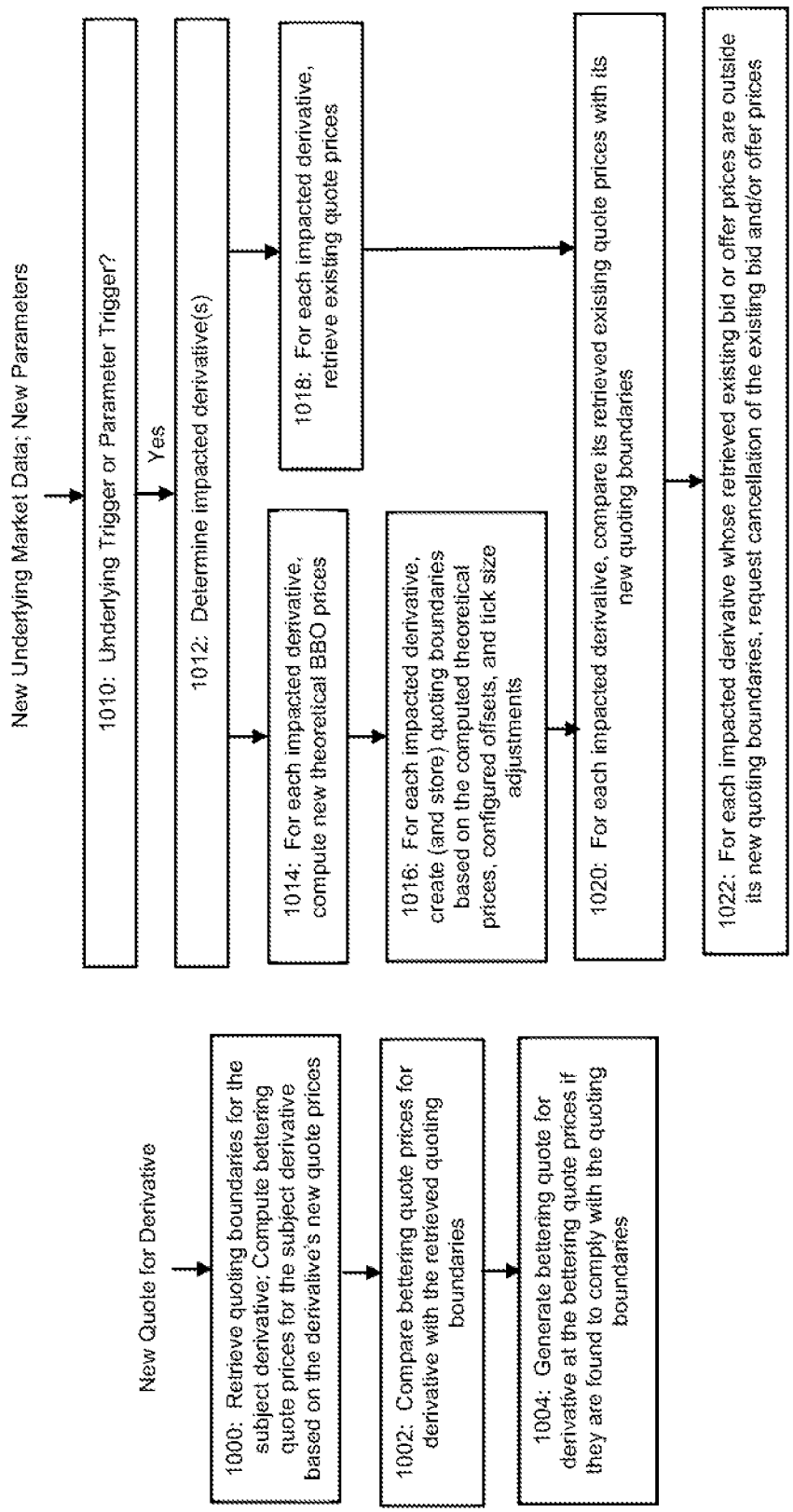
FIG. 10A provides an example of pipelined logic for carrying out bettering market making.

FIG. 10A provides an example of pipelined logic for carrying out bettering market making. The operations of FIG. 10A can be implemented via parallelized logic resources on the chip 500 so that each operation can operate concurrently with the other operations (e.g., see FIG. 16). Steps 1000, 1002, and 1004 are carried in largely the same fashion as steps 800, 802, and 804 of FIG. 8A (see also FIG. 16), except that these steps will include the computation of bettering prices for a quote candidate (e.g., one tick size better than the existing quote's pricing) and where these bettered quote prices are the ones that are compared with the quoting boundaries. Similarly, the quote cancellation decision logic of steps 1010-1022 can operate in the same manner at steps 810-822 of FIG. 8A.

Figure 10B:
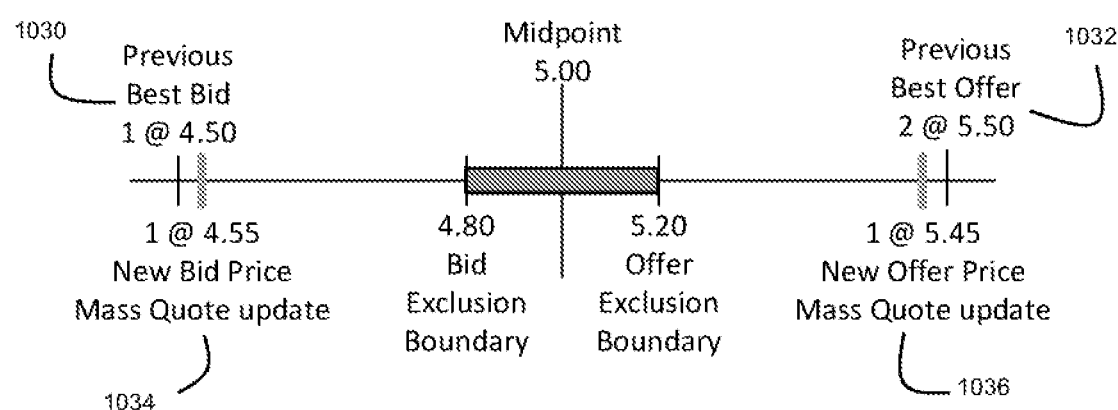
FIG. 10B provides an example of a bettering market making scenario.
Figure 10C:
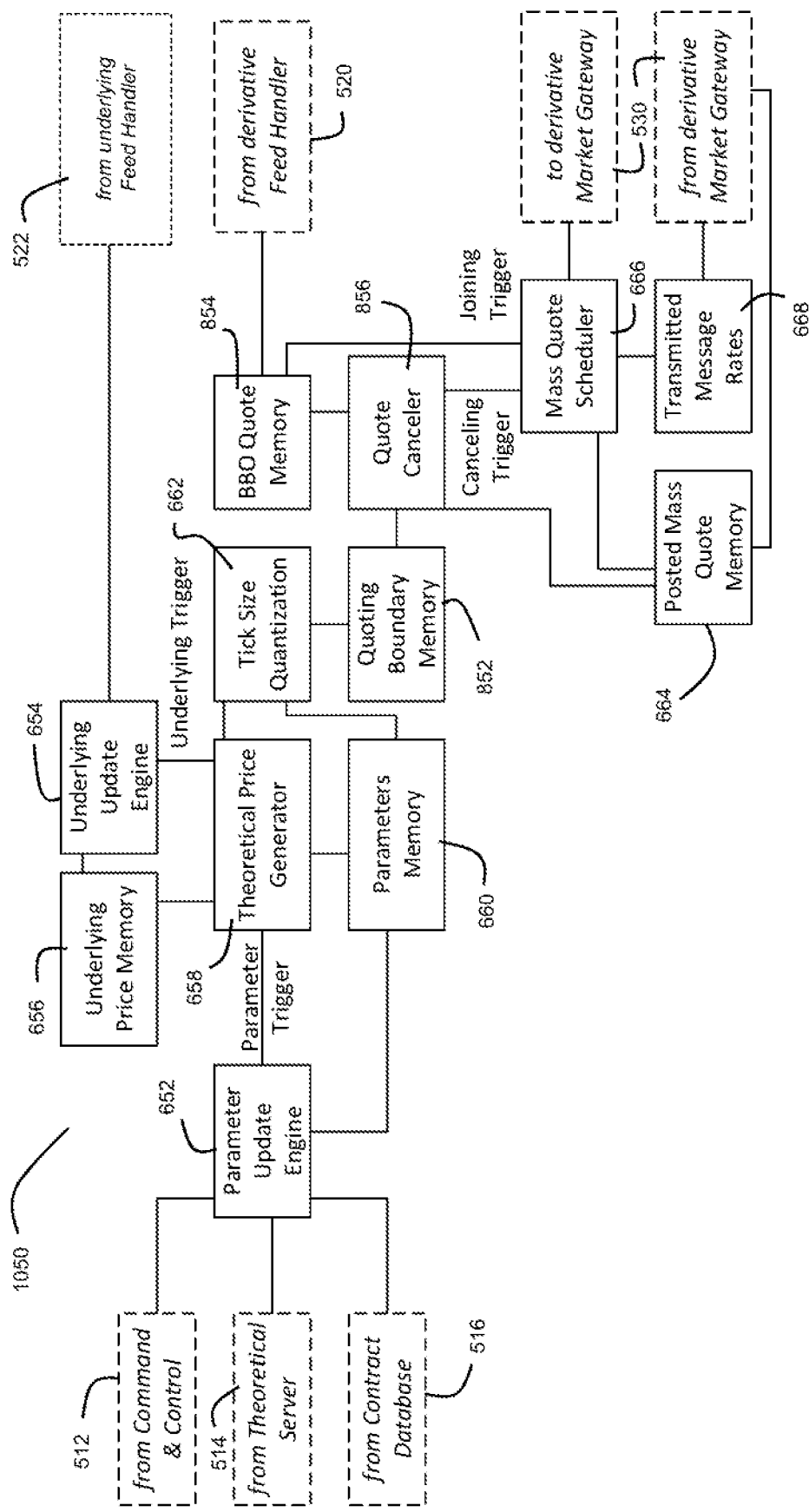
FIG. 10C provides a block diagram of an example bettering market making circuit.

Accordingly, as shown by FIG. 10C, an example bettering market making circuit 1050 can be configured nearly identically to the joining market making circuit 850, with the exception that the posted BBO prices for the mass quotes are offset by a specified tick increment "better than" the BBO prices on the trading venue. This specified tick increment can be a defined number of tick increments (e.g., a single tick increment, two tick increments, etc. as desired by a user). Accordingly, the bettering market making circuit 1050 can include the same basic components as the joining market making circuit 850 shown by FIG. 8B, but where the logic to test and set the mass quote prices (e.g., via 662 and 666) includes the defined tick increment adjustment for generated mass quotes.

FIG. 10B provides an example of a bettering scenario. The most recent market data update from the trading venue reports a best bid of one lot at $4.50 (see 1030) and a best offer of two lots at $5.50 (see 1032). The most recent parameters received from the Command and Control component 512 specify that quotes should better the market BBO by one tick increment and should post one lot sizes. The most recent parameters received from the Instrument Database component 516 specify that the tick increment for the contract is $0.05. Per the bettering logic, the circuit 1050 generates a mass quote with a best bid of one lot at $4.55 (see 1034) and a best offer of one lot at $5.45 (see 1036).

As with the joining circuit 850, the bettering circuit 1050 governs the posting of new mass quotes according to an exclusion boundary defined by theoretical price calculations. Note that the Quote Canceler logic simply adjusts its computation of a canceling trigger to determine if a new "bettered" quote price would fall within the exclusion boundary.

Combination Market Making

Note that the exclusion boundary used by the joining and bettering circuits 850/1050 may cause the VTE to post single-sided quotes that contain only a best bid or only a best offer. This can prevent the user from participating in trading opportunities that fit within their risk tolerance. In order to provide more opportunities to participate in market making trades, an example embodiment of the Market Making component 502 of the VTE can support combinations of the making, joining, and bettering logic.

Figure 11:
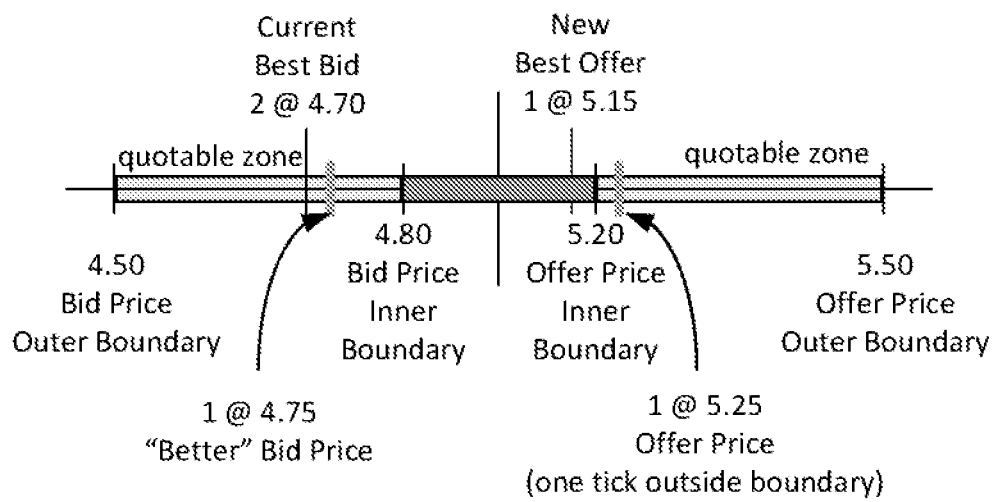
FIG. 11 provides an example of a combination market making scenario.

FIG. 11 provides an example of the operation of combination market making logic. As with the joining and bettering cases, theoretical price calculations continuously update the bid and offer prices that define an inner exclusion boundary. In the same manner, outer exclusion boundary prices are established. In another example embodiment, these outer boundary prices are generated by applying offset parameters specified by the user to the prices generated by the Theoretical Price Generator circuit 658 (which define the inner boundary prices). The bid and offer price ranges between the inner and outer boundary prices define a quotable zone for the combination market making logic.

A combination market making circuit allows users to specify the logic to be used to generate mass quotes. Typically, this is either the joining or bettering logic. Provided that the generated prices fall within the quotable zones, the logic operates as previously described. This is depicted in the example of FIG. 11 with the posting of a best bid of one lot at $4.75 which "betters" the market best bid of two lots at $4.70.

When a price falls within an inner boundary, the combination circuit allows the user to specify an alternative to simply canceling the posted price. Specifically, the circuit allows the user to specify the number of tick increments away from the cross boundary to post the price. Typically, the user specifies that the price be posted one tick increment outside of the boundary, but within the quotable zone. This is depicted in the example of FIG. 11 where the market best offer of one lot at $5.15 falls within the inner exclusion zone, less than the offer price inner boundary. Accordingly, the logic posts a best offer of one lot at $5.25 which is one tick increment outside of the inner exclusion boundary and within the quotable zone.

Variations of making, joining, and bettering logic, and combinations thereof, may be supported by the VTE.

Furthermore, in some example embodiments of the VTE, the market making circuit 502 can controllably implement any of a plurality of the basic, joining, and bettering market making strategies (or combinations thereof). Accordingly, the VTE can be configured to control which of the market making strategies are used by the VTE based on a plurality of criteria. As an example, the criteria include derivative-specific criteria. Through such derivative-specific criteria, a trading firm can define that derivatives within Derivative Set A are subjected to a first type of market making (e.g., basic market making) while the derivatives within Derivative Set B are subjected to a second type of market making (e.g., joining market making), and so on. In this fashion, the VTE can apply different market making strategies to different derivatives. As another example, the criteria include trading venue-specific criteria. Through such trading venue-specific criteria, a trading firm can define that derivatives which are traded on Trading Venue A are subjected to a first type of market making (e.g., basic market making) while derivatives which are traded on Trading Venue B are subjected to a second type of market making (e.g., joining market making), and so on. For example, for derivatives that trade on markets that apply pro rata apportionment, a joining market making strategy may be desirable; while for derivatives that trade on markets that apply time-based apportionment, a basic market making strategy may be desirable.

Aggressing Strategy:

Aggressing strategies seek to identify mispriced limit order or mass quotes and execute against them to accumulate profits. The most common scenario that creates opportunities for an Aggressing strategy is when a limit order for a derivative contract rests on the trading venue when a substantive change to the price of the underlying price occurs (where this underlying price change is potentially on another trading venue). When this occurs, it changes the theoretical price of the derivative contract. If the market participant is slow to cancel or update the price of the resting limit order, then another fast-acting market participant has the opportunity to execute against the limit order. This allows the participant to capture a portion of the price difference between the limit order and the new fair price of the derivative contract.

Figure 12:
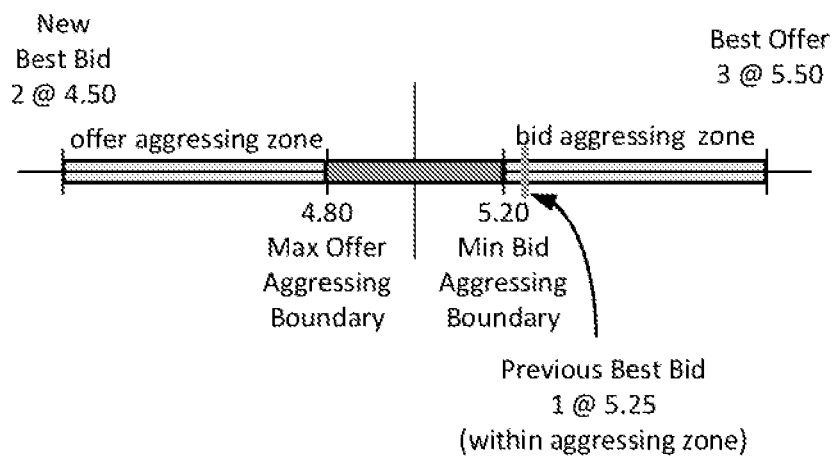
FIG. 12 provides an example of an aggressing scenario.

An example of an aggressing scenario is shown in FIG. 12. Initially, the best bid price of the derivative contract was $5.25, and a limit order was entered by a market participant that effectively joined the best bid (see the "Previous Best Bid" in FIG. 12).

Subsequently, the price of the underlying instrument moved lower, causing the new fair value of the best bid to be $4.50. A fast market participant quickly computes the new fair value of $4.50 for the derivative contract, detects the mispricing of the existing bid at $5.25, and sends a limit order to sell one lot at $5.25, which trades against the resting limit order with a bid price of $5.25.

There are a number of ways for the fast market participant to capture the difference between the transaction price and the new fair price—to effectively buy one lot at a price lower than the $5.25 price at which it was able to sell. The market participant could simply "better" the new best bid by posting a quote with a $4.55 bid price. Buying at this price would result in a profit of $0.70 for the market participant. More likely, the market participant will immediately hedge their new short position at $5.25 by using one of a number of known hedging strategies.

As shown in FIG. 5, an example embodiment of the VTE includes an aggressing circuit 504 that allows users to automate the execution of aggressing strategies.

Figure 13A:
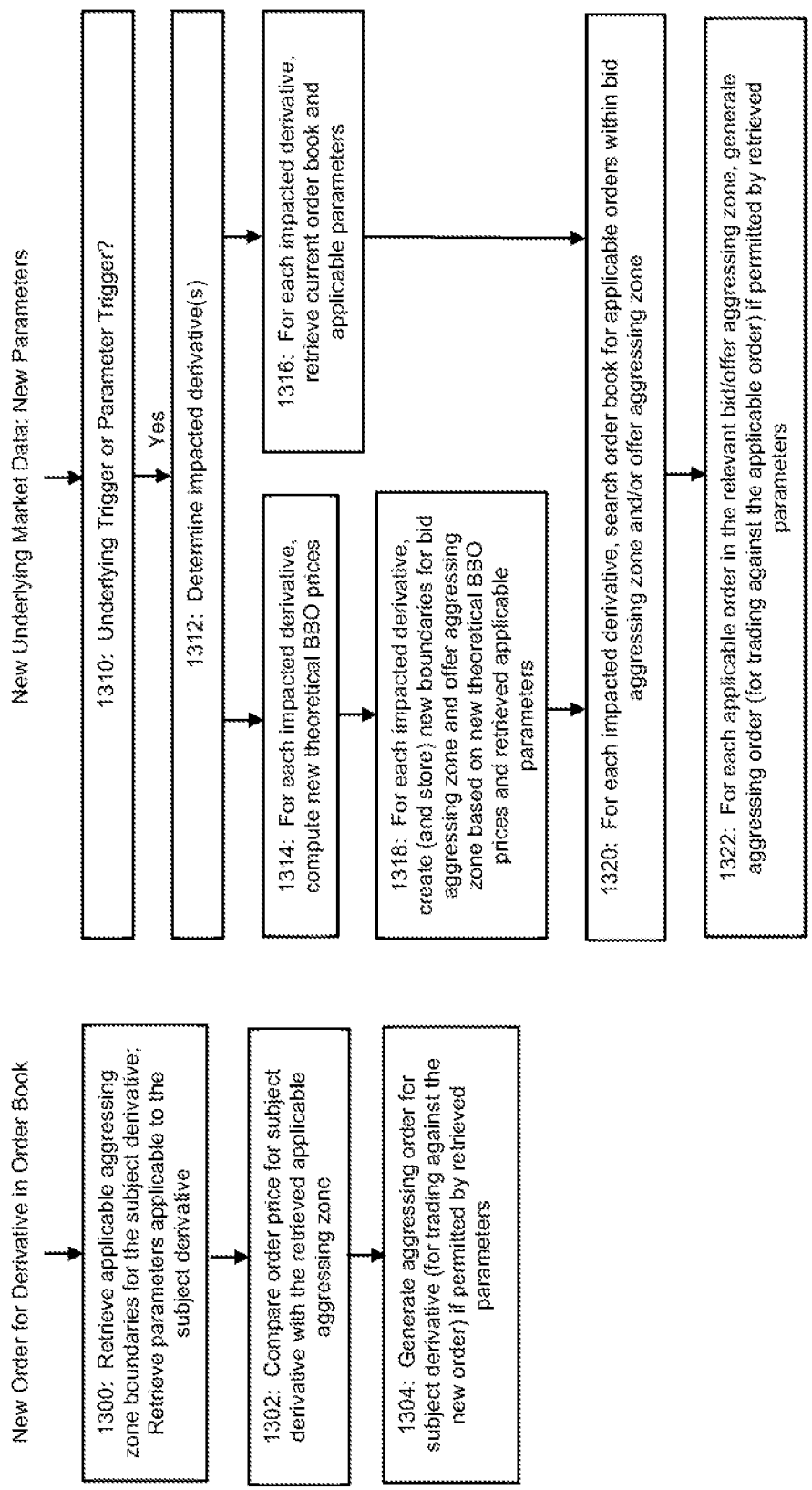
FIG. 13A provides an example of pipelined logic for carrying out an aggressing strategy.

FIG. 13A provides an example of pipelined logic for carrying out an aggressing strategy. The operations of FIG. 13A can be implemented via parallelized logic resources on the chip 500 so that each operation can operate concurrently with the other operations (e.g., see FIG. 16). The pipeline of FIG. 13A ingests and listens for (1) new orders for derivatives in the order book and (2) new underlying market data (from one or more underlying trading venues via one or more Feed Handlers 522) and/or new parameters (from the system's operational control subsystem). The pipeline can employ roughly two decision paths for handling these inputs—one path for deciding whether to create aggressing orders in response to new derivative orders in the order book and one path for deciding whether to create aggressing orders in response to new underlying market data or new control parameters.

For example, when a new order for a derivative is added to the order book, the pipeline will retrieve aggressing zone boundaries for the subject derivative at step 1300. These aggressing boundaries will define a bid aggressing zone and an offer aggressing zone for the subject derivative and control whether it would be deemed advantageous to profit from the new order. At step 1300, the pipeline can also retrieve parameters applicable to the subject derivative, which may include parameters such as a size threshold for potential aggressing orders and risk parameters for the trader.

In an example embodiment, the lower bound of the bid aggressing zone is determined by the theoretical offer price, and the upper bound of the bid aggressing zone is the maximum price allowed by the trading venue. Similarly, the upper bound of the offer aggressing zone is determined by the theoretical bid price, and the lower bound of the offer aggressing zone is the minimum price allowed by the trading venue. Note that the lower bid aggressing bound and the upper aggressing bound may also be determined from offsets to the theoretical bid and offer prices.

At step 1302, the pipeline compares the pricing for the new order with the retrieved aggressing zone boundaries. If the comparison at step 1302 results in a determination that the new order pricing falls within the applicable retrieved aggressing zone, then the pipeline generates an aggressing order for the subject derivative (to trade against the new order) if such an aggressing order is deemed permissible in view of the retrieved parameters (e.g., compliant with size thresholds, risk parameters, etc.) (see step 1304).

When new underlying market data or new parameter(s) are received, then steps 1310, 1312, and 1314 operate in a like manner as steps 600, 602, and 604 of FIG. 6C (see also FIG. 16). However, with an aggressing strategy, the computed theoretical fair bid and offer prices are used to define the aggressing zone boundaries for an impacted derivative rather than setting the BBO prices of a new quote. At step 1316, the pipeline can also retrieve the current order book and applicable parameters for each impacted derivative (where such parameters may also include parameters that help define the bid and offer aggressing zones). Accordingly, at step 1318, the pipeline—for each derivative impacted by the new underlying price or the new parameter(s)—creates (and stores) new bid aggressing zone boundaries and new offer aggressing zone boundaries for the subject derivative based on (1) the computed theoretical BBO prices (as tick size adjusted) and (2) the retrieved parameters. Then, at step 1320, the pipeline—for each impacted derivative—searches the order book for applicable orders that lie within the bid aggressing zone or offer aggressing zone (as applicable). This search can be performed using parallelized logic resources so that multiple orders in the order book are tested against the relevant aggressing zones in parallel. For each applicable order in the relevant bid/offer aggressing zone, the pipeline will generate an aggressing order for the subject derivative (to trade against the applicable order) if such an aggressing order is deemed permissible in view of the retrieved parameters (e.g., compliant with size thresholds, risk parameters, etc.) (see step 1322).

Figure 13B:
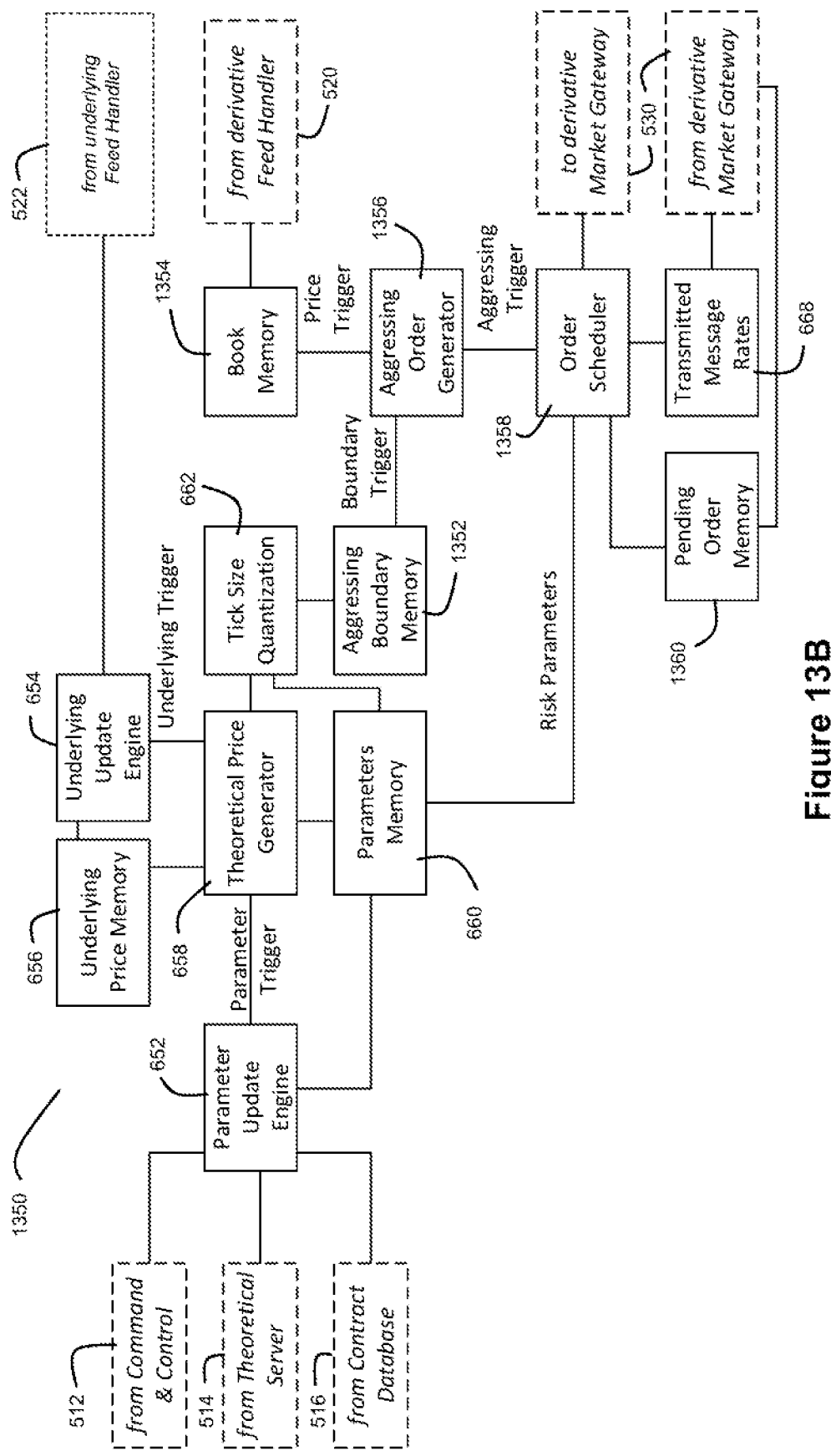
FIG. 13B provides a block diagram of an example aggressing circuit.

An example embodiment of an aggressing circuit 1350 is shown in FIG. 13B. It shares many of the same components as the market making circuits 650/850/1050, including logic resources for the Parameter Update Engine 652, Underlying Price Memory 656, Underlying Update Engine 654, Theoretical Price Generator 658, Parameters Memory 660, and Tick Size Quantization 662. For the aggressing circuit 1350, the Tick Size Quantization circuit 662 uses the generated theoretical prices and parameters received from the Parameters Memory 660 to update the prices that define the bid and offer aggressing zones.

A logic table for aggressing decision-making is below.

| Trigger | Need | Test | Action |
| --- | --- | --- | --- |
| New limit order for a subject derivative is added to the order book from the market | Does the new limit order fall within an applicable aggressing zone for the subject derivative? | Compare bid limit order with bid aggressing zone retrieved from the Aggressing Boundary Memory 1354 for the subject derivative; Compare offer limit order with offer aggressing zone retrieved from the Aggressing Boundary Memory 1354 for the subject derivative | If there is a resting offer in the offer aggressing zone, generate a bid order to trade against it; if there is a resting bid in the bid aggressing zone, generate an offer order to trade against it; Take appropriate additional actions to profit from the generated order |

-continued

| Trigger | Need | Test | Action |
|---|---|---|---|
| New quote for a subject derivative is received from the market | Does the new quote fall within an applicable aggressing zone for the subject derivative? | Compare quote's best bid price with bid aggressing zone retrieved from the Aggressing Boundary Memory 1354 for the subject derivative; Compare quote's best offer price with offer aggressing zone retrieved from the Aggressing Boundary Memory 1354 for the subject derivative | If the quote's best offer price is in the offer aggressing zone, generate a bid order to trade against it; if the quote's best bid price is in the bid aggressing zone, generate an offer order to trade against it; Take appropriate additional actions to profit from the generated order |
| New price of an underlying instrument for a subject derivative is received from market | Compute new aggressing zones (based on newly computed theoretical BBO prices that take into consideration the new underlying price) for subject derivative(s); Are there orders in the order book or quotes for the subject derivative that fall within the aggressing zones? | Compare orders in order book for subject derivative with the newly computed aggressing zones; Compare quotes for subject derivative with the newly computed aggressing zones | If there is a resting offer or quote offer in the offer aggressing zone, generate a bid order to trade against it; if there is a resting bid or quote bid in the bid aggressing zone, generate an offer order to trade against it; Take appropriate additional actions to profit from the generated order |

When an underlying trigger or parameter trigger results in a change in one or more prices that form the aggressing zone boundaries, a Boundary Trigger is sent to the Aggressing Order Generator 1356.

The Book Memory 1354 maintains a depth-of-market view of the posted prices for each enabled derivative contract. In an example embodiment, the Book Memory 1354 shows the price-aggregated view of the book for all price levels that fall within or are likely to fall within the aggressing zones following a shift in price. Limiting the number of price levels maintained reduces the memory and circuit bandwidth consumed on a per derivative contract basis, and thus boosts the capacity of the aggressing circuit 1350 to operate on a larger number of enabled derivative contracts. Market data updates to the Book Memory 1354 result in a price triggers to the Aggressing Order Generator 1356.

In response to a boundary trigger or a price trigger, the Aggressing Order Generator 1356 determines if any resting orders on the trading venue now fall within the defined aggressing zones. In addition to price values, the defined aggressing zones may include size thresholds for orders to be traded against. For example, even if a resting order's price falls within an aggressing zone, if it is an order for one lot and the minimum threshold is five lots, then an aggressing order will not be generated. If the specified aggressing conditions are met, the Aggressing Order Generator 1356 sends an aggressing trigger to the Order Scheduler 1358 with the specified action (buy or sell), price, and quantity.

In response to an aggressing trigger, the Order Scheduler 1358 determines if an aggressing order can be immediately transmitted to the trading venue. In an example embodiment, this determination as to whether a given aggressing order can be immediately transmitted to the trading venue is governed by risk parameters provided by the user, pending order status information from the Pending Order Memory 1360 (which can be on-chip memory similar in nature to Posted Mass Quotes Memory 664), and available order entry bandwidth defined by the Transmitted Message Rate circuit 668. Examples of risk parameters provided by a user include the maximum notional value of pending orders for all instruments, for all derivatives of a given underlying instrument, or for a single derivative contract. In an example embodiment, the user may also specify the type of aggressing order to use as another parameter. For example, a user may specify that Immediate Or Cancel (IOC) order types that instruct the trading venue to immediately execute the order upon receipt, if possible, else cancel the order and do not allow it to rest on the venue's order book. As with the market making circuits, the Transmitted Message Rates component 668 determines whether or not the VTE has exceeded its allowed transmission rate for orders.

If transmission bandwidth is available and the pending orders fall within defined risk limits, the Order Scheduler 1358 immediately transmits the aggressing order to the trading venue and adds an associated entry to the Pending Order Memory 1360. If any of the defined conditions prevent the Order Scheduler 1358 from immediately transmitting the order, the order is immediately abandoned or buffered for a specified period of time from the risk parameters.

Figure 13C:
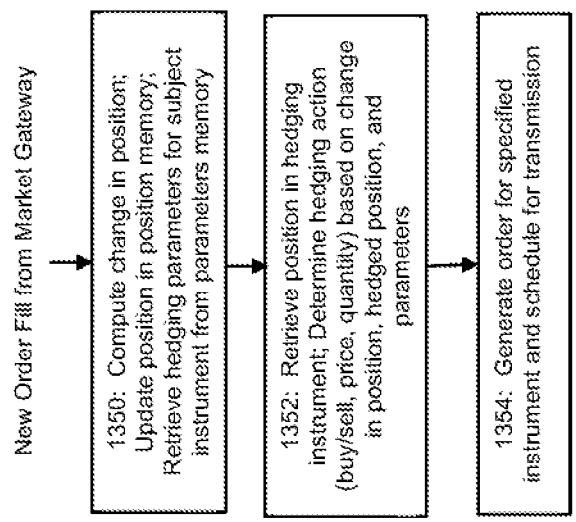
FIG. 13C provides an example of pipelined logic for carrying out a hedging strategy.

Hedging Strategy:

FIG. 13C provides an example of pipelined logic for carrying out a Hedging strategy 506. The operations of FIG. 13C can be implemented via parallelized logic resources on the chip 500 so that each operation can operate concurrently with the other operations. The pipeline of FIG. 13C ingests and listens for new order fills from one or more Market Gateways 530/532. The pipeline decides whether to create hedging orders in response to new order fills.

Figure 13D:
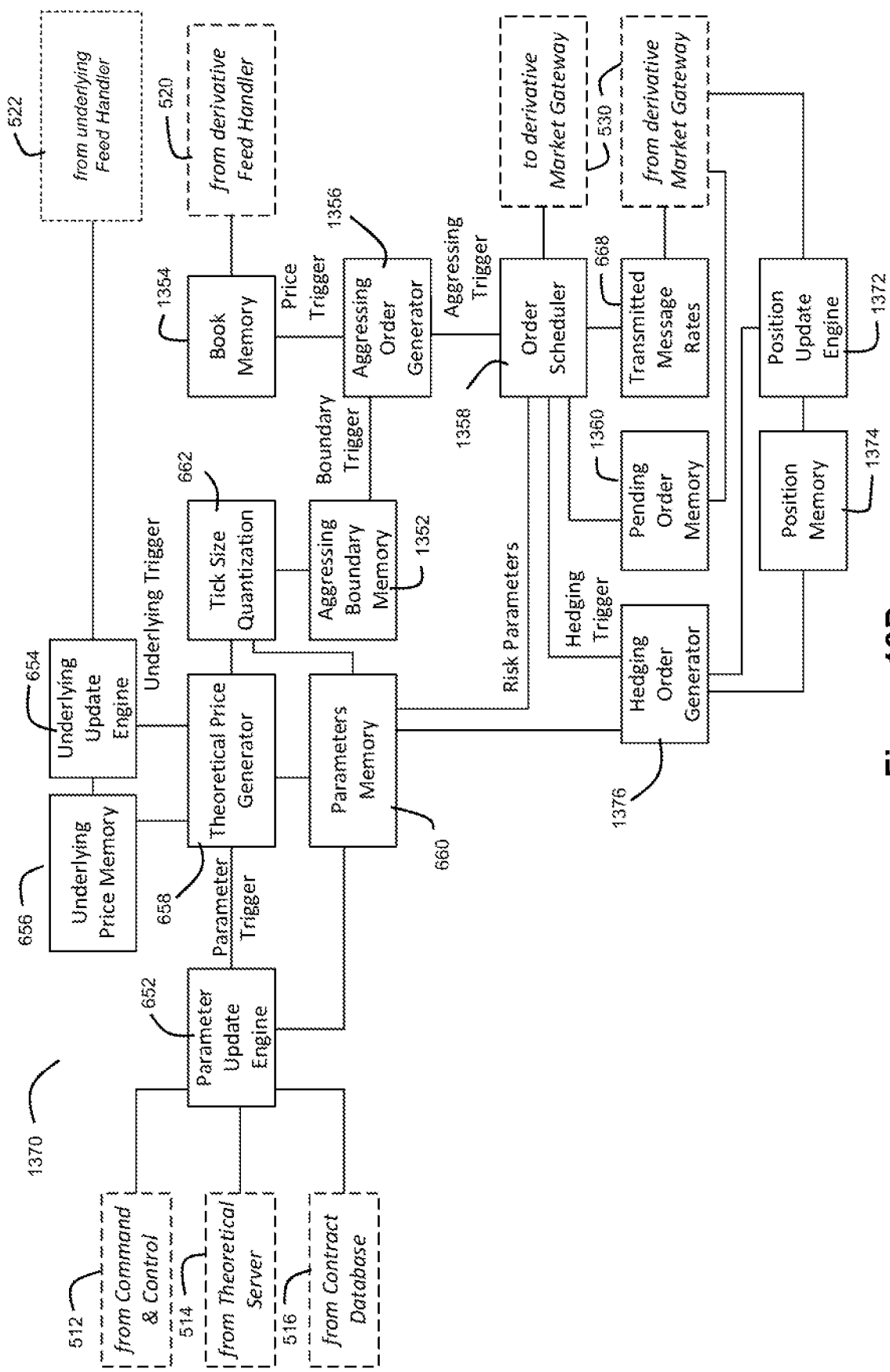
FIG. 13D provides a block diagram of an example hedging circuit in combination with an aggressing circuit.

For example, when a new fill for an instrument is received from a Market Gateway 530/532, the pipeline will determine the aggregate change in the position for the instrument at step 1350 (e.g., this can be performed by the Position Update Engine 1372 shown in FIG. 13D). The new position information is updated in the position memory for the instrument (e.g., see Position Memory 1374 in FIG. 13D). At step 1350, the pipeline can also retrieve hedging parameters applicable to the instrument, which may include parameters such as the hedging instrument and the hedging ratio.

At step 1352, the pipeline retrieves the current position in the hedging instrument and compares the current ratio of instrument position to hedging instrument position relative to the hedging ratio parameters. If the comparison at step 1352 results in a determination that the position ratio does not match the specified hedging ratio, then the pipeline at step 1352 generates a hedging order for the hedging instrument to achieve the specified ratio.

FIG. 13D shows an example embodiment where a hedging circuit 1370 is combined with the aggressing circuit 1350 of FIG. 13B to decide whether hedges should be created with respect to any of the aggressing orders generated by the aggressing circuit 1350. In the example of FIG. 13D, transmission of orders by the Order Scheduler 1358 can trigger the Hedging Order Generator component 1376 that makes a decision on whether to generate a hedging order as per step 1352.

Figure 15A:
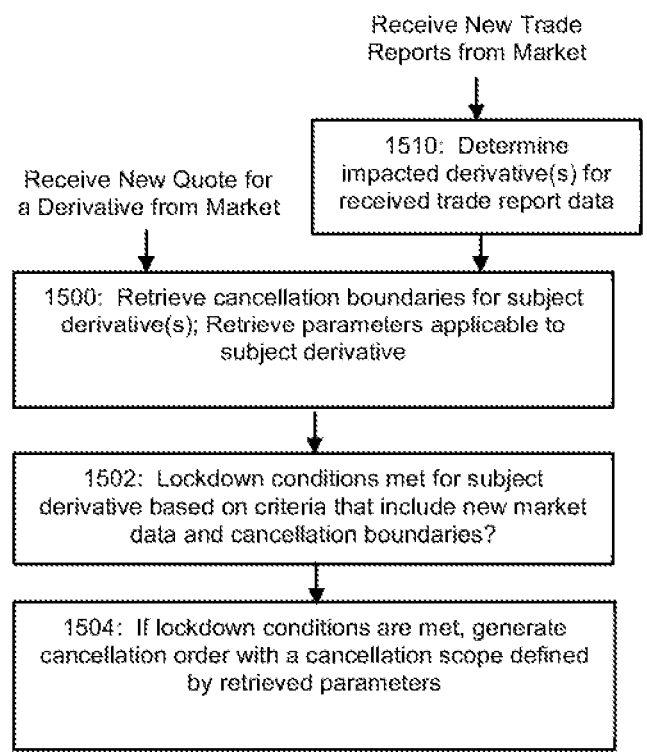
FIG. 15A provides an example of pipelined logic for carrying out a canceling strategy.

Canceling Strategy:

The example embodiment of FIG. 5 for the VTE also implements a Canceling strategy 508. Distinct from the canceling logic included in the aforementioned market making circuits, the logic resources that implement the Canceling strategy 508 (which can take the form of a canceling circuit) monitor the markets for conditions that represent significant risk and, when detected, enter a lockdown state. If the lockdown state is entered, the system so notifies the user via the User Terminal, Visualization component 510 and performs a set of prescribed actions by the user via the Command and Control component 512. In addition to the canceling operations described below, the trading system may also take actions such as sending messages to automated trading systems in other locations to enter a lockdown state. The prescribed actions also define when the lockdown state is exited FIG. 15A provides an example of pipelined logic for carrying out a canceling strategy. The operations of FIG. 15A can be implemented via parallelized logic resources on the chip 500 so that each operation can operate concurrently with the other operations. The pipeline of FIG. 15A ingests and listens for (1) new quotes on derivatives from the market and (2) new trade reports about derivatives or underlying instruments from the market. At step 1500, the pipeline retrieves cancellation boundaries for the pricing of the subject derivative(s). These boundaries can be stored in a cancellation boundary memory and generated on the basis of parameters stored in a parameter memory as populated based on input from the system's command and control interface. The pipeline can also retrieve parameters applicable to the subject derivative (e.g., parameters that can be used to define a scope of cancellation if needed). At step 1502, the pipeline determines whether lockdown conditions are met for the subject derivative based on criteria that include new market data and the retrieved cancellation boundaries. At step 1504, the pipeline generates a cancellation order if the lockdown conditions are found to be met at step 1502. The scope of this cancellation order can be defined based on the retrieved parameters. Furthermore, when operating based on new trade report data, the pipeline can also determine which derivatives are impacted by the new trade report data (step 1510). The process flow of steps 1500-1504 can then investigate whether cancellation orders are needed with respect to any of the impacted derivatives.

The cancellation parameters can also include a time window component. For example, the parameters can define a time window such as a rolling time window. This rolling time window would then encompass the execution prices for the subject instrument that fall within the window (e.g., the last 1 second of execution prices). The cancellation parameters can also include a price delta threshold. The logic can then identify the highest and lowest execution price for the subject instrument in this time window. The canceling strategy can then evaluate whether a given quote or order for the subject instrument has entered a cancellation zone. For example, using the last execution price for the subject instrument and the bid/offer update, the logic can subtract each of the last execution price, the most recent bid price, and the most recent offer price from the stored highest and lowest execution prices from the time window. This yields six values (namely, the differences between the three prices and the highest execution price and the differences between the three prices and the lowest execution price). If the absolute value of any of these six values is greater than or equal to the defined price delta threshold, then the logic determines that the subject instrument has entered the cancellation zone (which triggers the cancellation actions of the canceling strategy).

In an example embodiment, the Canceling circuit does not exit the lockdown state until prescribed by the user via the Command and Control component 512. Alternatively, the user may specify a timeout period whereby the Canceling circuit automatically exits the lockdown state following the prescribed timeout.

As a result of entering the lockdown state, the Canceling circuit cancels posted mass quotes, posted orders, and/or pending orders as prescribed by the canceling scope parameters provided by the user via the Command and Control component 512. The user may specify the scope of cancellation for all quotes and orders for all instruments traded by the user, for all instruments traded by the given VTE instance, for a defined group of underlying instruments and their associated derivatives, for a given underlying instrument and its associated derivatives, or for the specific instrument that triggered the lockdown condition. The canceling scope parameters also define the behavior of the lockdown filter which prevents all mass quote and order messages from being transmitted to the trading venue for the instruments within the scope. Note that additional canceling messages may be transmitted to the trading venue, e.g. in the case that a cancellation message was rejected due to exceeding bandwidth limits.

Note that a given VTE instance will have a limit on the number of instruments that may be enabled for trading. For example, the size of available memories on the reconfigurable logic device or ASIC (or other suitable chip) is a determiner of the number of instruments that may be traded by a VTE instance. As a result of practical limits, multiple instances of a VTE may be deployed to trade the desired number of instruments on a given trading venue. The user has the ability to define the canceling scope of the Canceling circuit within each VTE instance to match the set of instruments traded by each VTE instance. Alternatively, the user may define the canceling scope of one or more VTE instances to be all instruments traded by the user across all VTE instances. In this configuration, VTE instances notify peer VTE instances when a lockdown condition has been detected and all instances enter the lockdown state and perform the lockdown actions prescribed by the user.

Figure 14:
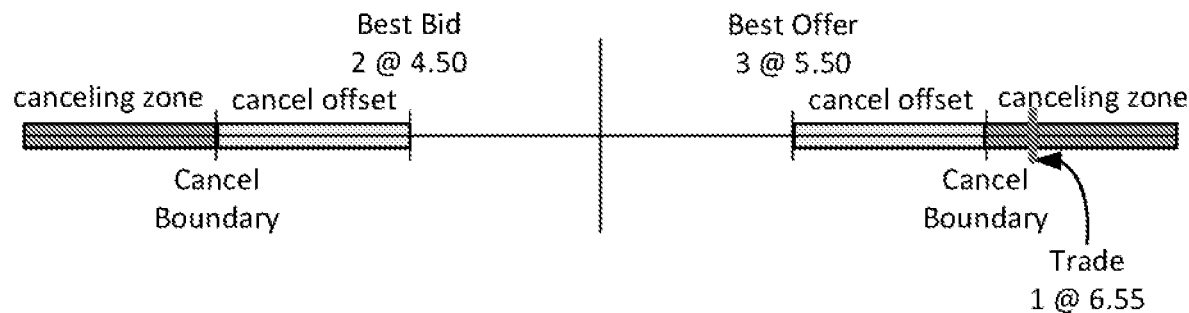
FIG. 14 provides an example of a canceling scenario.

FIG. 14 provides an example of canceling logic detecting a lockdown condition. In this example, the user defines cancel boundaries by specifying an offset relative to the current BBO prices for the subject instrument. Prices higher than the best offer plus the cancel offset or prices lower than the best bid minus the cancel offset fall within the canceling zone. If a trade occurs within the canceling zone, the reporting of this trade triggers a transition to the lockdown state, cancellation of posted mass quotes and pending orders according to the defined canceling scope, activation of the lockdown filter, and potential notification of peer VTE instances of the lockdown condition.

Note that additional conditions may be specified that trigger a transition to a lockdown state. For example, a posted best bid price higher than a posted best offer price represents a "crossed market". The existence of such a "crossed market" may be an unexpected error condition in a market, rather than an immediate arbitrage opportunity. A user may specify such a logical check as an additional canceling condition.

Figure 15B:
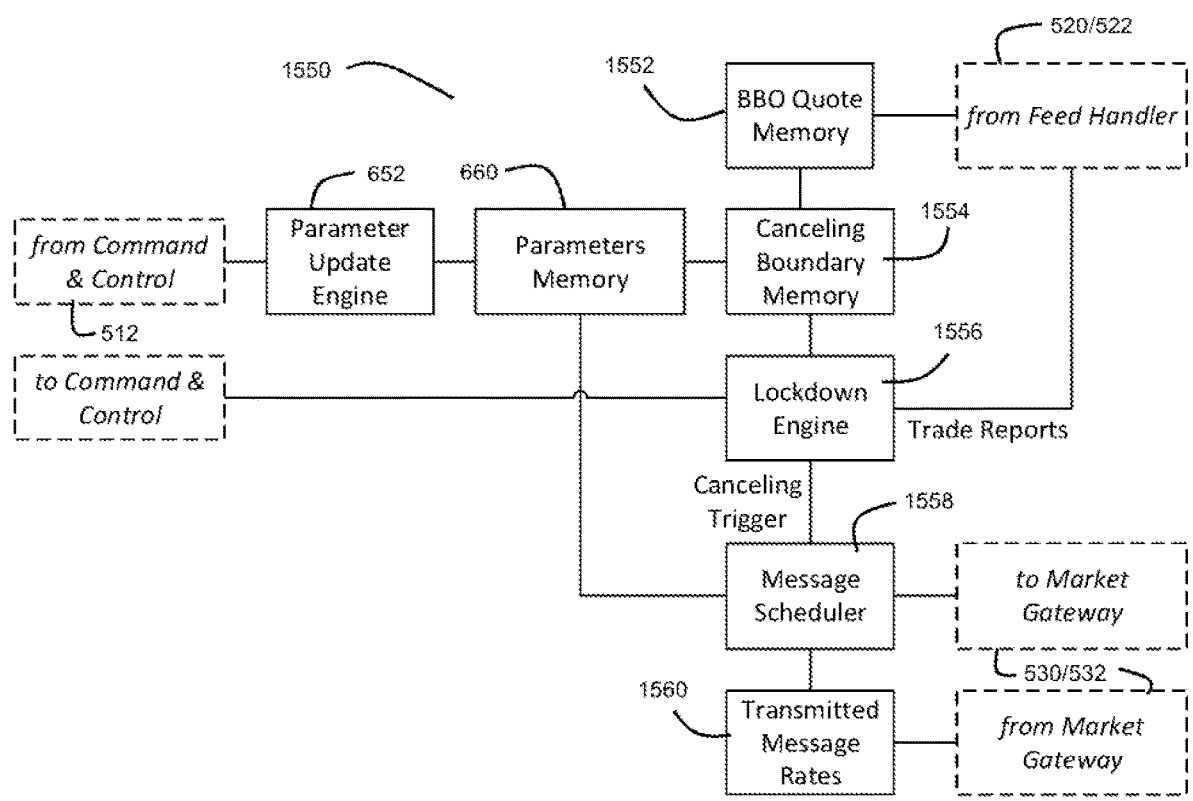
FIG. 15B provides a block diagram of an example canceling circuit.

An embodiment of a Canceling circuit 1550 is shown in FIG. 15B. Canceling parameters are passed from the user via the Command and Control component 512 to the Parameter Update Engine 652 and stored in the Parameters Memory 660. The current BBO prices for enabled instruments are stored in the BBO Quote Memory 1552 and continuously updated via market data messages from one more Feed Handler components 520/522. Lockdown Engine 1556 can process the trade report data and cancellation boundary data using the techniques discussed above to determine if a canceling trigger should be generated to indicate a lockdown condition. When a lockdown condition is detected, e.g. a trade report that contains a price within a specified canceling zone, the Lockdown Engine 1556 triggers mass quote and order cancellation messages per the user-defined scope to the Message Scheduler 1558 and notifies the user and peer VTE instances via the Command and Control component 512.

The Message Scheduler 1558 transmits the cancel messages to the Market Gateway component 530/532 at the maximum rate allowed by the venue. If any cancel messages are rejected by the venue as reported by the Market Gateway component 530/532, then the Message Scheduler 1558 resends the messages until it receives confirmation that all quotes and orders have been successfully cancelled.

In an example embodiment, the VTE logs all messages that it transmits to Market Gateways 530/532, Command and Control component 512. It also logs all messages received from Market Gateways 530/532.

In an example embodiment, the VTE provides monitoring metrics for operational staff to ensure proper operation. Monitoring metrics include the number of enabled instruments, the state of connectivity to market gateways, the count of rejected messages by a market gateway, the count of pending cancelation messages, an indicator of lockdown state, the rate of mass quote updates transmitted to trading venues, the number of rejected mass quote updates, etc. Monitoring interfaces that can be used include the Simple Network Monitoring Protocol (SNMP) and JavaScript Object Notation (JSON) formatted metrics delivered in response to Hypertext Transfer Protocol (HTTP) requests.

Furthermore, in an example embodiment where multiple strategies such as at least two of market making, aggressing, hedging, and canceling are deployed on the chip 500 together, a scheduler circuit can be shared by the different strategies (e.g., aggregating 666, 1358, and/or 1558) to prioritize transmission of various messages generated by the automated trading engine. For example, cancellation orders can be prioritized over mass quotes. As another example, aggressing orders can be prioritized over mass quotes. As yet another example, mass quote cancellations can be prioritized over new mass quotes or mass quote updates. Prioritization parameters in this regard can be defined via configuration parameters specified by a user. Parallelized logic resources can evaluate queued mass quotes, aggressing orders, etc. to determine which should be given priority for transmission.

While the invention has been described above in relation to its example embodiments, various modifications may be made thereto that still fall within the invention's scope. Such modifications to the invention will be recognizable upon review of the teachings herein.

What is claimed is:

1. An apparatus for automated trading at low latency, the apparatus comprising:
    a processor having parallelized computational resources that implement an automated trading engine;
    wherein the processor is configured to receive (1) streaming derivatives market data, the derivatives market data pertaining to a plurality of derivatives of a plurality of financial instruments, (2) streaming underlying market data, the underlying market data pertaining to the financial instruments underlying the derivatives, (3) a plurality of pricing parameters pertaining to the derivatives and the underlying financial instruments, and (4) a plurality of configuration parameters for operational control of the automated trading engine; and
    wherein the automated trading engine is configured to implement an aggressing strategy to generate a plurality of orders for one or more derivatives based on a plurality of conditions applied to the streaming derivatives market data, the streaming underlying market data, the pricing parameters, and the configuration parameters;
    wherein the automated trading engine comprises a plurality of logic resources that operate in parallel with each other to implement the aggressing strategy, wherein the logic resources implement different portions of the aggressing strategy and include:
        first logic resources configured to (1) process the received streaming underlying market data to generate an underlying trigger for a particular derivative in response to a change in pricing for the financial instrument underlying the particular derivative and (2) process the received pricing and configuration parameters to determine whether to generate a parameter trigger in response to a change in state of one or more of the pricing parameters and/or configuration parameters;
        second logic resources that operate in parallel with each other using non-iterative and feed-forward logic to compute a plurality of theoretical prices for a plurality of subject derivatives impacted by the streaming underlying market data in response to the generated underlying and/or parameter trigger and based on (i) the streaming underlying market data and (ii) the pricing parameters pertaining to the subject derivatives; and
        third logic resources configured to determine whether to generate the orders for one or more derivatives according to the aggressing strategy based on (i) one or more conditions applied to the computed theoretical prices and (ii) the configuration parameters; and
    wherein the processor is further configured to transmit the generated orders to one or more derivatives trading venues.

2. The apparatus of claim 1 wherein the first logic resources comprise an underlying update engine and a parameter update engine that operate in parallel with each other;
- wherein the underlying update engine is configured to process the received streaming underlying market data to generate an underlying trigger for a particular derivative in response to a change in pricing for the financial instrument underlying the particular derivative; and
- wherein the parameter update engine is configured to process the received pricing and configuration parameters to determine whether to generate a parameter trigger in response to a change in state of one or more of the pricing parameters and/or configuration parameters.

3. The apparatus of claim 1 wherein the processor comprises a field programmable gate array (FPGA), and wherein the automated trading engine is implemented as a hardware logic engine on the FPGA.

4. The apparatus of claim 1 wherein the processor comprises an application-specific integrated circuit (ASIC), and wherein the automated trading engine is implemented as a hardware logic engine on the ASIC.

5. The apparatus of claim 1 wherein the processor comprises a graphics processing unit (GPU), and wherein the automated trading engine is implemented on the GPU.

6. A method for automated trading at low latency, the method comprising:
- receiving streaming derivatives market data, the derivatives market data pertaining to a plurality of derivatives of a plurality of financial instruments;
- receiving streaming underlying market data, the underlying market data pertaining to the financial instruments underlying the derivatives;
- receiving a plurality of pricing parameters pertaining to the derivatives and the underlying financial instruments;
- receiving a plurality of configuration parameters for operational control of an aggressing strategy deployed in parallelized computational resources;
- the parallelized computational resources implementing the aggressing strategy to generate a plurality of orders for one or more derivatives based on a plurality of conditions applied to the streaming derivatives market data, the streaming underlying market data, the pricing parameters, and the configuration parameters, wherein the aggressing strategy is implemented via a plurality of logic resources that operate in parallel to implement different portions of the market making strategy, wherein the logic resources include first logic resources, second logic resources, and third logic resources, and wherein the implementing step includes:
  - processing the received streaming underlying market data to generate an underlying trigger for a particular derivative in response to a change in pricing for the financial instrument underlying the particular derivative, wherein the processing of the received streaming underlying market data is performed by the first logic resources;
  - processing the received pricing and configuration parameters to determine whether to generate a parameter trigger in response to a change in state of one or more of the pricing parameters and/or configuration parameters, wherein the processing of the received pricing and configuration parameters is performed by the first logic resources;
  - computing a plurality of theoretical prices for a plurality of subject derivatives impacted by the streaming underlying market data based on (i) the streaming underlying market data and (ii) the pricing parameters pertaining to the subject derivatives, wherein the computing step is performed by the second logic resources in response to the generated underlying and/or parameter triggers, wherein the second logic resources operate in parallel with each other using non-iterative and feed-forward logic to perform the computing;
  - determining whether to generate the orders for one or more derivatives according to the aggressing strategy based on (i) one or more conditions applied to the computed theoretical prices and (ii) the configuration parameters, and wherein the determining step is performed by the third logic resources; and
- transmitting the generated orders to one or more derivatives trading venues.

7. An apparatus for market making at low latency, the apparatus comprising:
- a processor having parallelized computational resources, wherein the parallelized computational resources comprise a plurality of logic resources that operate in parallel to implement different portions of a market making strategy;
- wherein the processor is configured to receive (1) streaming underlying market data, the underlying market data pertaining to a plurality of financial instruments underlying a plurality of derivatives, (2) a plurality of pricing parameters pertaining to the derivatives, and (3) a plurality of configuration parameters for operational control of the market making strategy;
- wherein the logic resources include:
  - first logic resources configured to (1) process the received streaming underlying market data to generate an underlying trigger for a particular derivative in response to a change in pricing for the financial instrument underlying the particular derivative and (2) process the received pricing and configuration parameters to determine whether to generate a parameter trigger in response to a change in state of one or more of the pricing parameters and/or configuration parameters;
  - second logic resources that operate in parallel with each other using non-iterative and feed-forward logic to compute a plurality of theoretical prices for a plurality of subject derivatives impacted by the streaming underlying market data in response to the generated underlying and/or parameter trigger and based on (i) the streaming underlying market data and (ii) the pricing parameters pertaining to the subject derivatives; and
  - third logic resources that generate a plurality of quotes for one or more of the subject derivatives based on (i) the computed theoretical prices for one or more of the subject derivatives and (ii) the configuration parameters; and
- wherein the processor is further configured to transmit the generated quotes to one or more derivatives trading venues.

8. The apparatus of claim 7 wherein the streaming underlying market data includes a plurality of new events for the financial instruments underlying the derivatives, wherein the second logic resources are configured to compute theoretical prices for derivatives impacted by the new events at a rate that supports a tick to trade latency less than 1 microsecond.

9. The apparatus of claim 7 wherein the market making strategy comprises a basic market making strategy.

10. The apparatus of claim 9 wherein the computed theoretical prices define best bid and offer (BBO) pricing for a plurality of the generated quotes in combination with defined offsets for the generated quotes to establish minimum spreads for the generated quotes.

11. The apparatus of claim 7 wherein the market making strategy comprises a joining market making strategy.

12. The apparatus of claim 11 wherein the third logic resources are configured to generate a quote for a subject derivative that matches pricing for an existing market quote for the subject derivative if the pricing for the existing market quote does not fall within an exclusion boundary for the subject derivative, and wherein the logic resources are further configured to define the exclusion boundary for the subject derivative based on the computed theoretical prices for the subject derivative.

13. The apparatus of claim 11 wherein the logic resources further comprise fourth logic resources that are configured to cancel an existing quote for a quoted derivative if updated current pricing for the quoted derivative as reflected in the streaming derivatives market data falls within an exclusion boundary for the subject derivative, and wherein the logic resources are further configured to define the exclusion boundary for the quoted derivative based on the computed theoretical prices for the quoted derivative.

14. The apparatus of claim 7 wherein the market making strategy comprises a bettering market making strategy.

15. The apparatus of claim 14 wherein the configuration parameters include parameters that define a number of tick size increments by which the generated quotes will better an existing quote according to the bettering market making strategy, and wherein the third logic resources include logic that defines conditions for the bettering market making strategy to adjust pricing for the generated quotes by the defined number of tick size increments.

16. The apparatus of claim 14 wherein the third logic resources are configured to generate a quote for a subject derivative that betters pricing for an existing market quote for the subject derivative by a defined number of tick size increments if the bettered pricing for the existing market quote does not fall within an exclusion boundary for the subject derivative, and wherein the logic resources are further configured to define the exclusion boundary for the subject derivative based on the computed theoretical prices for the subject derivative.

17. The apparatus of claim 14 wherein the logic resources further comprise fourth logic resources that are configured to cancel an existing quote for a quoted derivative if updated current pricing for the quoted derivative as reflected in the streaming derivatives market data falls within an exclusion boundary for the subject derivative, and wherein the logic resources are further configured to define the exclusion boundary for the quoted derivative based on the computed theoretical prices for the quoted derivative.

18. The apparatus of claim 7 wherein the market making strategy comprises a joining market making strategy and/or a bettering market making strategy, and wherein the computed theoretical prices define exclusion boundaries that govern conditions for decisions to generate joining and/or bettering quotes.

19. The apparatus of claim 18 further comprising a quoting boundary memory that is configured to store data defining the exclusion boundaries for a plurality of derivatives.

20. The apparatus of claim 19 wherein the market making strategy comprises the joining market making strategy, and wherein the third logic resources are further configured to generate a quote for a subject derivative with pricing that matches a new market quote for the subject derivative from the streaming derivatives market data if the new market quote has pricing that falls outside the exclusion boundary in the quoting boundary memory for the subject derivative.

21. The apparatus of claim 19 wherein the market making strategy comprises the bettering market making strategy, and wherein the third logic resources are further configured to generate a quote for a subject derivative with pricing that betters a new market quote for the subject derivative from the streaming derivatives market data by a defined number of tick size increments if the bettered new market quote has pricing that falls outside the exclusion boundary in the quoting boundary memory for the subject derivative.

22. The apparatus of claim 7 wherein the second logic resources comprise a plurality of instances of the second logic resources for computing a plurality of theoretical prices for a plurality of subject derivatives in parallel with each other.

23. The apparatus of claim 22 wherein the logic resources include fourth logic resources that are configured to determine a plurality of derivatives that are impacted by a new price for a financial instrument within the streaming underlying market data, and wherein a plurality of the instances of the second logic resources are configured to compute the new theoretical prices for a plurality of the determined impacted derivatives in parallel.

24. The apparatus of claim 7 wherein the pricing parameters comprise, for each of a plurality of the derivatives, (1) a reference theoretical price for that derivative, (2) a reference price for the financial instrument underlying that derivative, and (3) at least one Greek value pertaining to pricing for that derivative relative to pricing for the underlying financial instrument, wherein the second logic resources are configured to compute the theoretical prices for the subject derivatives based on the reference theoretical prices for the subject derivatives, the at least one Greek values for the subject derivatives, and changes in pricing for the financial instruments underlying the subject derivatives relative to the reference underlying financial instrument prices for the subject derivatives.

25. The apparatus of claim 24 further comprising a parameter memory configured to store the pricing parameters, and wherein the second logic resources are configured to retrieve the reference theoretical prices, the reference underlying financial instrument prices, and at least one the Greek values pertaining to the subject derivatives from the parameter memory.

26. The apparatus of claim 7 wherein the third logic resources are configured to (1) generate the quotes for a plurality of the subject derivatives and (2) schedule transmission of the generated quotes to the one or more derivatives trading venues.

27. The apparatus of claim 26 wherein the third logic resources are further configured to (1) monitor transmission rates with the one or more derivatives trading venues and (2) schedule the transmission of generated quotes to the one or more derivatives trading venues based on the monitored transmission rates as compared to permitted transmission rate limits with the one or more derivatives trading venues.

28. The apparatus of claim 26 wherein the third logic resources are further configured to (1) queue generated quotes in a memory while awaiting transmission to the one or more derivatives trading venues and (2) if the second logic resources generate new theoretical pricing pertaining to a subject quote in the queue, update the queued subject quote based on the new theoretical pricing.

29. The apparatus of claim 26 wherein the logic resources further include:
fourth logic resources configured to perform tick size quantization on the generated theoretical prices for the subject derivatives to generate BBO pricing for the quotes for the subject derivatives, wherein the BBO pricing includes one or more defined offsets relative to the theoretical prices for the subject derivatives and is aligned with tick protocols for the one or more derivatives trading venues.

30. The apparatus of claim 7 wherein the logic resources further comprise:
fourth logic resources configured to determine a plurality of derivatives that are impacted by new pricing for a subject financial instrument that is present in the streaming underlying market data; and
wherein the second logic resources are configured to generate new theoretical prices for the determined derivatives based on the new pricing for the subject financial instrument, wherein the new theoretical prices impact how the third logic resources generate quotes for the determined derivatives.

31. The apparatus of claim 30 wherein the market making strategy comprises a basic market making strategy, and wherein the third logic resources are configured to generate quotes for the determined derivatives at quote prices based on the generated new theoretical prices for the determined derivatives as adjusted by defined offsets.

32. The apparatus of claim 31 wherein the defined offsets establish minimum spreads for the generated quotes.

33. The apparatus of claim 30 wherein the market making strategy comprises a basic market making strategy, a joining market making strategy, and/or a bettering market making strategy, and wherein the second logic resources further comprise a plurality of parallel instances of the second logic resources for computing new theoretical prices for a plurality of the determined derivatives in parallel.

34. The apparatus of claim 30 wherein the second logic resources are further configured to refresh the new theoretical prices for the determined derivatives at a computational latency of 5 to 50 nanoseconds.

35. The apparatus of claim 7 wherein the logic resources implement different portions of a plurality of market making strategies, wherein the marketing making strategies include at least two members of the group consisting of (1) basic market making, (2) joining market making, and (3) bettering market making.

36. The apparatus of claim 35 wherein the market making strategies include a combination of the basic and the joining market making strategies.

37. The apparatus of claim 35 wherein the market making strategies include a combination of the basic and the bettering market making strategies.

38. The apparatus of claim 35 wherein the market making strategies include a combination of the joining and bettering market making strategies.

39. The apparatus of claim 35 wherein the market making strategies include a combination of the basic, joining, and bettering market making strategies.

40. The apparatus of claim 35 wherein the market making strategies as implemented by the logic resources are capable of applying different pricing strategies to different sides of the generated quotes.

41. The apparatus of claim 40 wherein the logic resources are further configured to adjust a best bid price or a best offer price for a generated quote of a subject derivative to be a defined number of tick size increments outside a subject exclusion boundary if an applicable market making strategy would have otherwise blocked generation of the quote for having pricing that falls within the subject exclusion boundary.

42. The apparatus of claim 35 wherein the processor is further configured to control which of the market making strategies are used to generate quotes based on a plurality of criteria.

43. The apparatus of claim 42 wherein the criteria include derivative-specific criteria.

44. The apparatus of claim 42 wherein the criteria include trading venue-specific criteria.

45. The apparatus of claim 7 wherein the processor comprises a field programmable gate array (FPGA), and wherein the parallelized computational resources are implemented as a hardware logic engine on the FPGA.

46. The apparatus of claim 7 wherein the processor comprises an application-specific integrated circuit (ASIC), and wherein the parallelized computational resources are implemented as a hardware logic engine on the ASIC.

47. The apparatus of claim 7 wherein the processor comprises a graphics processing unit (GPU), and wherein the parallelized computational resources are implemented on the GPU.

48. The apparatus of claim 7 wherein the parallelized computational resources are further configured to analyze a plurality of the generated quotes in parallel to prioritize the quotes for scheduled transmission to a trading venue.

49. The apparatus of claim 7 wherein the parallelized computational resources operate in a parallelized manner to achieve a tick to trade latency of 50 nanoseconds to 500 nanoseconds.

50. The apparatus of claim 7 wherein the parallelized computational resources operate in a parallelized manner to achieve sustained throughputs of at least 10 million messages per second.

51. The apparatus of claim 7 wherein the processor further comprises one or more feed handlers that ingest streaming market data from one or more trading venues, the streaming market data including the streaming underlying market data, and wherein the one or more feed handlers are configured to (1) normalize and extract fields from the streaming market data and (2) provide the normalized and extracted fields to the parallelized computational resources.

52. The apparatus of claim 7 further comprising a plurality of the processors, wherein the parallelized computational resources of the processors operate on different sets of derivatives.

53. The apparatus of claim 7 wherein the generated quotes include single-sided quotes and/or double-sided quotes.

54. A method for market making at low latency, the method comprising:
receiving streaming underlying market data, the underlying market data pertaining to a plurality of financial instruments underlying a plurality of derivatives;
receiving a plurality of pricing parameters pertaining to the derivatives;
receiving a plurality of configuration parameters for operational control of a market making engine deployed in parallelized computational resources;
the parallelized computational resources implementing a market making strategy via a plurality of logic resources that operate in parallel to implement different portions of the market making strategy, wherein logic resources include first logic resources, second logic resources, and third logic resources, and wherein the implementing step includes:

processing the received streaming underlying market data to generate an underlying trigger for a particular derivative in response to a change in pricing for the financial instrument underlying the particular derivative, wherein the processing of the received streaming underlying market data is performed by the first logic resources;

processing the received pricing and configuration parameters to determine whether to generate a parameter trigger in response to a change in state of one or more of the pricing parameters and/or configuration parameters, wherein the processing of the received pricing and configuration parameters is performed by the first logic resources;

computing a plurality of theoretical prices for a plurality of subject derivatives impacted by the streaming underlying market data based on (i) the streaming underlying market data and (ii) the pricing parameters pertaining to the subject derivatives, wherein the computing step is performed by the second logic resources in response to the generated underlying and/or parameter trigger, wherein the second logic resources operate in parallel with each other using non-iterative and feed-forward logic to perform the computing;

generating a plurality of quotes for one or more of the subject derivatives based on (i) the computed theoretical prices for one or more of the subject derivatives and (ii) the configuration parameters, wherein the generating step is performed by the third logic resources, and wherein the generated quotes are for transmission to one or more derivatives trading venues; and transmitting the generated quotes to one or more derivatives trading venues.

55. The apparatus of claim 7 wherein the first logic resources comprise an underlying update engine and a parameter update engine that operate in parallel with each other;

wherein the underlying update engine is configured to process the received streaming underlying market data to generate an underlying trigger for a particular derivative in response to a change in pricing for the financial instrument underlying the particular derivative; and wherein the parameter update engine is configured to process the received pricing and configuration parameters to determine whether to generate a parameter trigger in response to a change in state of one or more of the pricing parameters and/or configuration parameters.

56. The apparatus of claim 7 wherein the computed theoretical prices comprise theoretical midpoint prices and/or theoretical best bid and offer prices.

57. The apparatus of claim 7 wherein the processor comprises one or more market gateways configured to interface with the one or more derivatives trading venues and transmit the generated quotes to the one or more derivatives trading venues.

* * * * *